(12) United States Patent
Stirm et al.

(10) Patent No.: US 7,331,407 B2
(45) Date of Patent: Feb. 19, 2008

(54) VIBRATION REDUCTION APPARATUS FOR POWER TOOL AND POWER TOOL INCORPORATING SUCH APPARATUS

(75) Inventors: Michael Stirm, Oberursel (DE); Heinz-Werner Faatz, Schmitten (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/556,971

(22) PCT Filed: Mar. 19, 2004

(86) PCT No.: PCT/EP2004/002914

§ 371 (c)(1),
(2), (4) Date: Nov. 15, 2005

(87) PCT Pub. No.: WO2004/082897

PCT Pub. Date: Sep. 30, 2004

(65) Prior Publication Data

US 2007/0017684 A1    Jan. 25, 2007

(30) Foreign Application Priority Data

Mar. 21, 2003  (GB) .................................. 0306525
Oct. 11, 2003  (GB) .................................. 0323885

(51) Int. Cl.
*B25D 11/00* (2006.01)

(52) U.S. Cl. ..................... 173/201; 173/48; 173/162.1; 173/210

(58) Field of Classification Search ................ 173/201, 173/104, 109, 114, 124, 205, 122, 162.1, 173/210, 211, 49, 162.2, 48

See application file for complete search history.

(56) References Cited

U.S. PATENT DOCUMENTS

| 1,802,987 A |   | 4/1931 | Shook |
|---|---|---|---|
| 2,632,331 A |   | 3/1953 | Pinazza |
| 2,875,731 A |   | 3/1959 | Settles et al. |
| 3,023,628 A | * | 3/1962 | Heppner .......................... 74/55 |

(Continued)

FOREIGN PATENT DOCUMENTS

DE          2653064     *  5/1978

(Continued)

*Primary Examiner*—Scott A. Smith
(74) *Attorney, Agent, or Firm*—Michael P. Leary; Charles E. Yocum; Adan Ayala

(57) ABSTRACT

A vibration reduction apparatus for use with a hammer tool having a hammer piston is disclosed. The hammer piston is caused to reciprocate in the cylinder by rotation of a gear wheel and crank drive. A cam is mounted around the gear wheel, a counterweight surrounds the piston cylinder, and a cam follower is provided on the counterweight. The cam follower on the counterweight is urged into contact with the cam by a biasing element. The external profile of the cam is such that rotation of the gear wheel causes oscillation of the counterweight in anti-phase to motion of the hammer piston to counteract vibrations produced by operation of the hammer action of the tool.

18 Claims, 19 Drawing Sheets

U.S. PATENT DOCUMENTS

| | | | |
|---|---|---|---|
| 3,845,827 A | | 11/1974 | Schulin |
| 4,276,941 A | * | 7/1981 | Wanner et al. ............... 173/117 |
| 4,279,091 A | | 7/1981 | Edwards |
| 4,346,768 A | * | 8/1982 | Ross ........................... 173/118 |
| 4,385,665 A | | 5/1983 | Knoll |
| 4,442,906 A | * | 4/1984 | Simpson ....................... 173/48 |
| 4,478,293 A | | 10/1984 | Weilenmann et al. |
| 4,567,951 A | * | 2/1986 | Fehrle et al. ................ 173/201 |
| 4,592,431 A | | 6/1986 | Tornquist |
| 4,984,640 A | * | 1/1991 | Gillan et al. ................ 173/205 |
| 4,991,664 A | * | 2/1991 | Kolgan et al. ............... 173/201 |
| 5,355,964 A | * | 10/1994 | White ............................ 173/1 |
| 5,511,533 A | | 4/1996 | Waller |
| 6,000,310 A | | 12/1999 | Shilkrut et al. |
| 6,015,017 A | * | 1/2000 | Lauterwald ................... 173/48 |
| 6,112,830 A | | 9/2000 | Ziegler et al. |
| 6,415,876 B1 | | 7/2002 | Bollinger et al. |
| 6,488,195 B2 | * | 12/2002 | White et al. ................. 227/130 |
| 6,763,897 B2 | * | 7/2004 | Hanke et al. ............... 173/210 |
| 6,907,943 B2 | * | 6/2005 | Ikuta ........................... 173/117 |
| 7,096,973 B2 | * | 8/2006 | Ikuta et al. .................. 173/201 |
| 7,252,157 B2 | | 8/2007 | Makita |

FOREIGN PATENT DOCUMENTS

| | | | |
|---|---|---|---|
| DE | 10142569 A | * | 3/2003 |
| GB | 2053768 A | * | 2/1981 |

\* cited by examiner

| Impact cycle | Current | Mean |
|---|---|---|
| Impact No. | 298 | |
| Ram Power Out | 916 | 862 W |
| Blow Energy | 36.90 | 34.71 J |
| Blow Frequency | 26.50 | 26.5 Hz |
| Blow Velocity | 9.60 | 9.31 m/s |
| Compression | 14.30 | 14.1:1 |
| Motor Speed | 15467 | 15467 RPM |

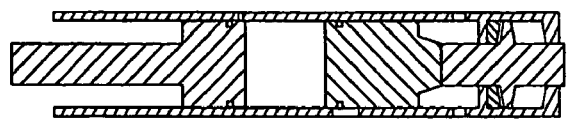

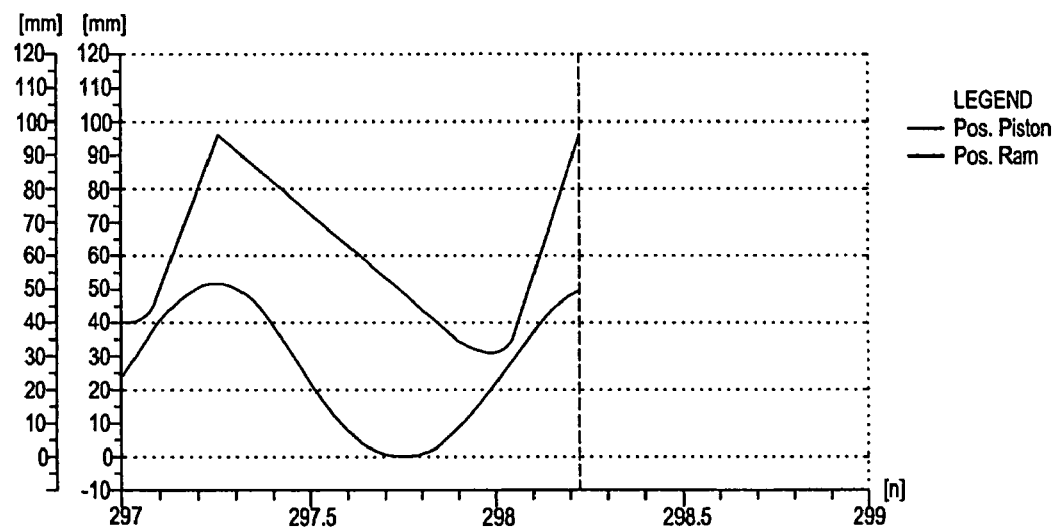

| | | | |
|---|---|---|---|
| Mean Power Output | 862 W | Min. Distance Ram/Piston | 6.469 mm |
| Blow Energy | 34.71 J | Max. Force Exerted | 2502 N |
| Blow Frequency | 26.5 Hz | Max. Torque | 7.58 Nm |
| Blow Velocity Ram | 9.3 m/s | Max. Compression | 14.7 |
| Total Blow Efficiency | 0.68 | Max. Temperature Elev. | 525.4 K |
| Efficiency H.M. | 0.76 | Avg. Temperature Elev. | 142.2 K |
| Motor Speed | 15467 RPM | Penetration Rate | 0 cm³/min |
| Heat Conduction | 2.4 W/K/dm² | Energy Density | 0.0 kJ/m² |
| Vibration (EN 50144) | 16.5 m/s² | Volume Flow | 0.000 |

Motor

| | |
|---|---|
| Idle Speed | 21937 RPM |
| Nominal Speed | 15467 RPM |
| Nominal Torque | 0.883 Nm |
| Max. Torque | 5 Nm |
| Gear Ratio Motor/Piston | 0.10266:1 |
| Gear Ratio Motor/Drill Bit | 0:1 |
| Gear Efficiency | 0.95 |

FIG.13A

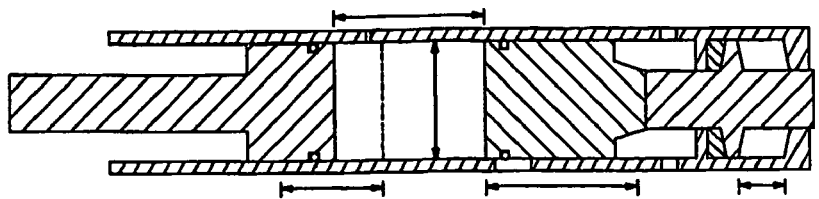

Ram
| | |
|---|---|
| Mass including seal | 801 g |
| Total ram length | 65.9 mm |
| Sealing offset | 7 mm |
| Clearance inside cylinder | 0.03 mm |

Cylinder
| | |
|---|---|
| Diameter | 48 mm |
| Air spring length | 70 mm |
| Decompr. Cross section | 170 mm |
| Diam ratio casing/cylinder | 2 |
| Hammer mass | 16 kg |

Bleed holes
| | |
|---|---|
| #1 Diameter | 1.5 mm |
| #1 Position | 22 mm |
| #2 Diameter | 15 mm |
| #2 Position | 83 mm |

Flat piston
| | |
|---|---|
| Total stroke length | 52 mm |
| Sealing offset | 7 mm |
| Total mass (incl. con rod) | 99 g |
| Clearance inside cylinder | 0.5 mm |
| Total rod length | 106 mm |

Beat piece
| | |
|---|---|
| Max. beat piece travel dist. | 20 mm |
| Min. ram/beat piece vol. | 4 cm3 |
| Beat piece mass | 999 g |

Rebound Damper System
| | |
|---|---|
| Spring constant | 150 N/mm |
| Dyn. Viscosity | 100 Pa·s |
| Damper block length | 5 mm |

Physical Data

Initial Values
| | |
|---|---|
| Piston starting position | 120° |
| Max. Iteration step size | 10° |
| Starting motor speed | 15467 RPM |
| Ram leakage diameter | 0 mm |
| Activation pressure | 0 bar |

Pressure/Temp. Elev.
| | |
|---|---|
| Ambient temperature | 293 K |
| Temp. elev. ram/piston | 60 K |
| Temp. elev. ram/BP | 60K |
| Temp. elev. casing chmbr. | 40K |
| Ambient pressure | 1 bar |
| Pressure ram/piston | 1 bar |
| Pressure ram/BP | 1 bar |
| Pressure casing chmbr. | 1 bar |

Constraints

Environment
| | |
|---|---|
| Avg. temp. elev. casing | 60 K |
| Avg. temp. elev. cylinder | 100 K |
| Heat transfer coefficient | 10 W/Km2 |
| Decomp. x-section casing chmbr. | 8 mm2 |
| Dynamic viscosity lubrication | 1 Pa·s |
| Coulomb friction coefficient | 0.08 |
| R/T transformer efficiency | 0.95 |

Load
| | |
|---|---|
| Restitution coefficient | 0.25 |
| Max. random dev. restitution | 0.1 |
| Rebound delay | 0.1 ms |
| Drill bit diameter | 0 mm |
| Friction load on drill bit | 130N |
| Specific material demolition | 5 mm3/J |
| Bias load (hand/arm force) | 300N |

FIG.13B

Hammer Data

| | | |
|---|---|---|
| Part Number | :BDF046 | |
| Name | :LIGHT PAVEMENT BREAKER | |
| Mass of the piston | (m1) [ g ] : | 99.0 |
| Mass of the ram | (m2) [ g ] : | 801.0 |
| Mass of the beat piece | (m4) [ g ] : | 68.0 |
| Mass of the rotary hammer | ( m) [kg] : | 16.0 |
| Total stroke | ( H) [mm] : | 52.0 |
| Total length of the ram | (L2) [mm] : | 65.9 |
| Diameter of the piston | (d1) [mm] : | 48.0 |
| Diameter of the bleed hole 1 | [mm] : | 1.5 |
| Diameter of the bleed hole 2 | [mm] : | 15.0 |
| Dist. Impact point - piston head | (LO) [mm] : | 135.9 |
| Dist. bleed hole 1 – piston head | [mm] : | 22.0 |
| Dist. bleed hole 2 – piston head | [mm] : | 83.0 |
| Sealing offset of piston | [mm] : | 7.0 |
| Sealing offset of ram | [mm] : | 7.0 |
| Max. displacement for ram catching | [mm] : | 20.0 |
| Clearance of ram | [mm] : | 0.03 |
| Clearance of piston | [mm] : | 0.50 |
| Con-rod length | [mm] : | 106.0 |
| Min. volume between ram and beat piece | [ccm] : | 4.0 |
| Cross section of opened area ram/beat | mm»] : | 170.0 |
| Ratio ambient volume/volume of h.m. | : | 2 |
| Spring rate of rebound damping | [N/mm] : | 150 |
| Dynamic viscos. rebound damping | [kg/m/s] : | 100.0 |
| Max. displ. of rebound damping | [mm] : | 5 |

Motor Data

| | | |
|---|---|---|
| Part Number | :BD1585 | |
| Name of the motor | :LIGHT PAVEMENT BREAKER | |
| No load speed of the motor | [RPM] : | 21937 |
| Speed at mean torque | [RPM] : | 15467 |
| Speed at start of calculation | [RPM] : | 15467 |
| Maximum torque of the motor | [ Nm] : | 999.99 |
| Mean torque of the motor | [ Nm] : | 0.88 |
| Gear ratio: piston-drive/motor | : | 0.1027 |
| Gear ratio: drill-bit/motor | : | 0.0000 |
| Efficiency of gear ratio | : | 0.95 |

Load Data

| | | |
|---|---|---|
| Coefficient of restitution | : | 0.20 |
| Max. deviation of restitution | : | 0.10 |
| Diameter of drill-bit | [mm] : | 0.0 |
| Specific load torque of drill-bit | [ N] : | 130 |
| Specific material demolition | [m^3/J] : | 5.0 |
| Bias Load (horizontal) | [ N] : | 300 |

FIG.14

Physical Data and Constraints

| | | |
|---|---|---|
| Barometric pressure..................................... | [hPa] : | 1.00 |
| Leakage to barometric volume....................... | [mm^2] : | 4.00 |
| Temperature of barometric volume.................. | [ K] : | 293 |
| Av. temp. elevation of ambient metal.............. | [ K] : | 60 |
| Coeff. of heat transfer................................... | [W/K/m»] : | 10 |
| Dynamic viscos friction of h.m. .................... | [kg/m/s] : | 1.0 |
| Coulomb friction coeff. of h.m. ..................... | : | 0.08 |
| Efficiency of R-T transformer ....................... | : | 0.95 |
| | | |
| Rebound delay............................................. | [ms] : | 0.10 |
| Basic iteration step....................................... | [deg] : | 10.0 |
| | | |
| Startposition of piston.................................. | [deg] : | 120 |
| Startpressure (ram/piston)............................. | [hPa] : | 1.00 |
| Startpressure (ram/beat piece)....................... | [hPa] : | 1.00 |
| Startpressure (ambient volume)..................... | [hPa] : | 1.00 |
| Starttemp. elevation (ram/piston).................. | [K] : | 80 |
| Starttemp. elevation (ram/beat piece)............ | [K] : | 80 |
| Starttemp. elevation (ambient volume).......... | [K] : | 60 |

Simulation Result

| | | |
|---|---|---|
| RMS power out of the ram............................ | [ W] : | 849 |
| Blow energy of the ram................................. | [ J] : | 33.40 |
| Blow frequency............................................ | [Hz] : | 26.5 |
| Efficiency of h.m. (excl. R/T)......................... | : | 0.77 |
| Blow speed of the ram.................................. | [m/s] : | 9.1 |
| Max. compression........................................ | : | 18.2 |
| Max. temperature elevation........................... | [ K] : | 591.9 |
| RMS temperature elevation........................... | [ K] : | 154.1 |
| Heat dens. on cyl. to be conducted................ | [W/cm»] : | 1.0 |
| Min. dist. between ram a. piston................... | [mm] : | 5.289 |
| Max. force on piston-drive............................ | [ N] : | 3134 |
| Max. torque on pinion.................................. | [Nm] : | 9.14 |
| Vibration at bias load (EN 50144).................. | [m/s»] : | 6.5 |
| Chuck speed................................................ | [RPM] : | 0 |
| Motor power out RMS.................................. | [ W] : | 1239 |
| Total blow efficiency.................................... | : | 0.68 |

FIG.14 continued

VIBRATION REDUCTION APPARATUS FOR POWER TOOL AND POWER TOOL INCORPORATING SUCH APPARATUS

FIELD OF THE INVENTION

The present invention relates to a vibration reduction apparatus for a power tool and to a power tool incorporating such apparatus. The invention relates particularly, but not exclusively, to vibration reduction apparatus for powered hammers, and to hammers incorporating such apparatus.

DESCRIPTION OF THE RELATED ART

Electrically driven hammers are known in which a driving member in the form of a flying mass is reciprocally driven in a piston, and impact of the flying mass against the end of the piston imparts a hammer action to a bit of the hammer. Such an arrangement is disclosed in European patent application EP1252976 and is shown in FIG. 1.

Referring in detail to FIG. 1, the prior art demolition hammer comprises an electric motor 2, a gear arrangement and a piston drive arrangement which are housed within a metal gear housing 5 surrounded by a plastic housing 4. A rear handle housing incorporating a rear handle 6 and a trigger switch arrangement 8 is fitted to the rear of the housings 4, 5. A cable (not shown) extends through a cable guide 10 and connects the motor to an external electricity supply. When the cable is connected to the electricity supply when the trigger switch arrangement 8 is depressed, the motor 2 is actuated to rotationally drive the armature of the motor. A radial fan 14 is fitted at one end of the armature and a pinion is formed at the opposite end of the armature so that when the motor is actuated the armature rotatingly drives the fan 14 and the pinion. The metal gear housing 5 is made from magnesium with steel inserts and rigidly supports the components housed within it.

The motor pinion rotatingly drives a first gear wheel of an intermediate gear arrangement which is rotatably mounted on a spindle, which spindle is mounted in an insert to the gear housing 5. The intermediate gear has a second gear wheel which rotatingly drives a drive gear. The drive gear is non-rotatably mounted on a drive spindle mounted within the gear housing 5. A crank plate 30 is non-rotatably mounted at the end of the drive spindle remote from the drive gear, the crank plate being formed with an eccentric bore for housing an eccentric crank pin 32. The crank pin 32 extends from the crank plate into a bore at the rearward end of a crank arm 34 so that the crank arm can pivot about the crank pin 32. The opposite forward end of the crank arm 34 is formed with a bore through which extends a trunnion pin 36 so that the crank arm 34 can pivot about the trunnion pin 36. The trunnion pin 36 is fitted to the rear of a piston 38 by fitting the ends of the trunnion pin 36 into receiving bores formed in a pair of opposing arms which extend to the rear of the piston 38. The piston is reciprocally mounted in cylindrical hollow spindle 40 so that it can reciprocate within the hollow spindle. An O-ring seal 42 is fitted in an annular recess formed in the periphery of the piston 38 so as to form an airtight seal between the piston 38 and the internal surface of the hollow spindle 40.

When the motor 2 is actuated, the armature pinion rotatingly drives the intermediate gear arrangement via the first gear wheel and the second gear wheel of the intermediate gear arrangement rotatingly drives the drive spindle via the drive gear. The drive spindle rotatingly drives the crank plate 30 and the crank arm arrangement comprising the crank pin 32, the crank arm 34 and the trunnion pin 36 converts the rotational drive from the crank plate 30 to a reciprocating drive to the piston 38. In this way the piston 38 is reciprocatingly driven back and forth along the hollow spindle 40 when the motor is actuated by a user depressing the trigger switch 8.

The spindle 40 is mounted in magnesium housing 42 from the forward end until an annular rearward facing shoulder (not shown) on the exterior of the spindle butts up against a forward facing annular shoulder (not shown) formed from a set of ribs in the interior of the magnesium casing 42. The ribs enable air in the chamber surrounding the spindle 40 to circulate freely in the region between ram 58 and beat piece 64. An increased diameter portion on the exterior of the spindle fits closely within a reduced diameter portion on the interior of the magnesium casing 42. Rearwardly of the increased diameter portion and the reduced diameter portion an annular chamber is formed between the external surface of the spindle 40 and the internal surface of the magnesium casing 42. This chamber is open at its forward and rearward ends. At its forward end the chamber communicates via the spaces between the ribs in the magnesium casing with a volume of air between the ram 58 and the beat piece 64. At its rearward end the chamber communicates via the spaces between the ribs 7 and the recess of the gear casing 5 with a volume of air in the gear casing 5.

The volume of air in the gear casing 5 communicates with the air outside of the hammer via a narrow channel 9 and a filter 11. The air pressure within the hammer, which changes due to changes in the temperature of the hammer, is thus equalised with the air pressure outside of the hammer. The filter 11 also keeps the air within the hammer gear casing 5 relatively clean and dust free.

A ram 58 is located within the hollow spindle 40 forwardly of the piston 38 so that it can also reciprocate within the hollow spindle 40. An O-ring seal 60 is located in a recess formed around the periphery of the ram 58 so as to form an airtight seal between the ram 58 and the spindle 40. In the operating position of the ram 58 (shown in the upper half of FIG. 1), with the ram located behind bores 62 in the spindle, a closed air cushion is formed between the forward face of the piston 38 and the rearward face of the ram 58. Reciprocation of the piston 38 thus reciprocatingly drives the ram 58 via the closed air cushion. When the hammer enters idle mode (i.e. when the hammer bit is removed from a work piece), the ram 58 moves forwardly, past the bores 62 to the position shown in the bottom half of FIG. 1. This vents the air cushion and so the ram 58 is no longer reciprocatingly driven by the piston 38 in idle mode, as is known to persons skilled in the art.

However, known hammer drills of this type suffer from the drawback that the hammer action generates significant vibrations, which can be harmful to users of the apparatus, and can cause damage to the apparatus itself.

It is known to reduce the effect of vibrations on users of power tools by providing absorbent material around handles of the tool, the absorbent material acting as passive vibration damping material. However, the effectiveness of such materials in reducing the transmission of vibrations to the user of the apparatus is limited.

Active vibration reduction apparatus are known in which rotatable masses are driven about respective axes of rotation, the centres of mass of the rotatable masses being spaced from the axes of rotation such that rotation of the masses about the axes of rotation generates vibrations. By controlling the frequency of rotation of the masses, and the relative phases between the centres of mass of the masses, vibrations can be generated which can be used to counteract unwanted vibrations, for example in diesel motors. Such arrangements are disclosed in FR 2606110, WO 88/06687, FR 2550471, EP 0840191, EP 0505976 and EP 0337040. However, it has not to date been considered feasible to apply such techniques to the reduction of unwanted vibrations generated in power tools.

DE 3427342 discloses a hammer drill in which a wobble plate drive mounted to a shaft causes reciprocating movement of a flying mass to impart impacts to a bit of the drill. The wobble plate drive has a finger engaging a piston forming part of the hammer mechanism such that rotation of a shaft to which the wobble plate is mounted causes reciprocating movement of the piston, and a countermass arranged on an opposite side of the shaft to the finger to partially counteract vibrations produced by the apparatus. However, this drill suffers from the drawback that its vibration reducing abilities and compactness are limited.

GB 2256905 discloses a reciprocating saw in which first and second wobble plates reciprocatingly drive a saw blade and counterweight respectively to minimise vibrations produced by the saw. However, this saw suffers from the drawback that the provision of a pair of wobble plates makes it difficult to construct the saw compactly.

BRIEF SUMMARY OF THE INVENTION

Preferred embodiments of the present invention seek to overcome the above disadvantages of prior art power tools.

According to an aspect of the present invention, there is provided a vibration reduction apparatus for a power hammer apparatus comprising a housing, a motor arranged in the housing, a piston adapted to be caused by the motor to execute reciprocating motion in a bore, and a flying mass arranged in the bore such that said reciprocating motion of said piston in said bore in use causes reciprocating motion of said flying mass relative to the housing to impart impacts to a working member of the hammer apparatus, the vibration reduction apparatus comprising at least one driveable mass adapted to at least partially surround at least part of the bore, and wherein at least one said driveable mass is adapted to be caused by the motor to execute reciprocating motion to at least partially cancel vibration of said housing caused by reciprocating motion of the flying mass relative to the housing.

By providing at least one driveable mass adapted to at least partially surround at least part of the bore, wherein at least one said driveable mass is adapted to be caused by the motor to execute reciprocating motion to at least partially cancel vibration of the housing caused by reciprocating motion of the flying mass relative to the housing, this provides the advantage of enabling the power hammer apparatus to be of more compact construction, while at the same time minimising twisting torque applied to the housing by operation of the power hammer apparatus.

The apparatus may further comprise at least one driving gear adapted to be driven by said motor to cause motion of said flying mass and to cause said reciprocating motion of at least one said driveable mass.

The vibration reduction means may further comprise cam means rotatable by means of at least one driving gear and adapted to engage at least one said drivable mass.

The apparatus may further comprise first biasing means for urging at least one said drivable mass into engagement with said cam means.

The apparatus may further comprise cam follower means for converting rotary motion of said cam means into reciprocating motion of at least one said drivable mass.

The biasing means may be adapted to urge at least one said drivable mass into engagement with said cam follower means.

The cam follower means may comprise at least one notch adapted to receive a respective projection on at least one said drivable mass.

This provides the advantage of facilitating disengagement of the drivable mass from the cam follower means.

The or each said driveable mass may be adapted to move out of engagement with the cam means when the power hammer apparatus is disengaged from a workpiece.

The apparatus may further comprise retaining means for holding the or each said driveable mass out of engagement with said cam means when the power hammer apparatus is disengaged from a workpiece.

The retaining means may comprise sealing means adapted to act between a working member of the power hammer apparatus and the housing.

The apparatus may further comprise deactivating means for deactivating said vibration reduction apparatus.

Said deactivating means may comprise means for disengaging said cam means from said motor.

Said deactivating means may comprise locking means for locking at least one said driveable mass in position relative to the housing.

At least one said driveable mass may be driven by means of air displaced by said flying mass.

The apparatus may further comprise sensor means for detecting phase and/or amplitude of vibrations produced by said vibration reduction apparatus.

The apparatus may further comprise adjustment means for adjusting the phase and/or amplitude of vibrations produced by said vibration reduction apparatus.

The apparatus may further comprise control means for controlling said adjustment means in response to said sensor means.

The apparatus may further comprise at least one support member for supporting at least one driveable mass, and adapted to be caused by the motor to execute reciprocating motion, wherein at least one said driveable mass is slideable relative to at least one said support member during said reciprocating motion of said driveable mass, and second biasing means for urging said driveable mass into engagement with at least one said support member.

At least one said support member may comprise a sleeve for at least partly surrounding at least part of said bore.

The apparatus may further comprise damping means for damping impacts between at least one said driveable means and at least one said support member.

According to another aspect of the present invention, there is provided a power hammer apparatus comprising:
a housing;
a motor arranged in the housing;
a piston adapted to be caused by said motor to execute reciprocating motion in a bore;
a flying mass arranged in the bore such that said reciprocating motion of said piston in said bore in use causes reciprocating motion of said flying mass relative to said housing to impart impacts to a working member of the power hammer apparatus; and
a vibration reduction apparatus as defined above.

The apparatus may further comprise a piston cylinder defining said bore.

At least one said driveable mass may be adapted to form at least part of said piston cylinder.

This provides the advantage of enabling the power hammer apparatus to be made of even more compact construction.

The apparatus may further comprise at least one projection provided on said piston cylinder for engaging cam follower means of said vibration reduction apparatus.

At least one said projection may be provided on an internal surface of said piston cylinder.

This provides the advantage of further assisting compact construction of the apparatus.

The apparatus may further comprise sensor means for detecting phase and/or amplitude of vibrations produced by said vibration reduction means.

The apparatus may further comprise control means for controlling said adjustment means in response to said sensor means.

The apparatus may further comprise drive means for causing reciprocating motion of at least one said driveable mass and/or said piston.

Said drive means may comprise a shaft adapted to be rotated by means of said motor, a drive member having an engaging portion for engaging at least one said driveable mass and/or said flying mass, and a counterweight offset from a position diametrically opposite said engaging portion.

According to a further aspect of the present invention, there is provided a vibration reduction apparatus for a power tool comprising a housing, and a motor in the housing adapted to cause movement of at least one first working member of the tool, the apparatus comprising at least one pair of rotatable masses, the or each said pair comprising respective first and second rotatable masses adapted to be rotated in opposite senses to each other about respective first and second axes of rotation, wherein each of said first and second rotatable masses has a respective centre of mass spaced from the corresponding said axis of rotation.

Said first and second masses of at least one said pair may comprise respective gear wheels.

Said gear wheels of at least one said pair may mesh with each other.

The rotatable masses of at least one said pair may be coaxially mounted.

This provides the advantage of enabling the vibration reduction means to be of more compact construction.

The vibration reduction apparatus may further comprise adjustment means for adjusting the phase and/or amplitude of vibrations produced by said apparatus.

The apparatus may further comprise at least one driving gear adapted to be driven by said motor to cause movement of at least one said first working member and to drive said vibration reduction means.

This provides the advantage of ensuring that the vibration reduction means is driven at the same frequency as the first working member of the tool.

Said adjustment means may comprise means for rotating at least one said driving gear relative to at least one said first working member.

Said adjustment means may comprise means for rotating said masses of at least one said pair relative to each other by a predetermined angle.

According to a further aspect of the invention, there is provided a power tool comprising:

a housing;

a motor in the housing adapted to cause movement of at least one first working member of the tool; and a vibration reduction apparatus as defined above.

The motor may be adapted to drive at least one said first working member via a said rotatable mass of at least one said pair.

At least one said driveable mass may be adapted to form at least part of said piston cylinder.

This provides the advantage of enabling the apparatus to be of more compact construction.

The apparatus may further comprise at least one projection provided on said piston cylinder for engaging cam follower means of said vibration reduction apparatus.

At least one said projection may be provided on an internal surface of said piston cylinder.

This provides the advantage of further assisting compact construction of the apparatus.

The apparatus may further comprise sensor means for detecting phase and/or amplitude of vibrations produced by said vibration reduction means.

The apparatus may further comprise control means for controlling said adjustment means in response to said sensor means.

The apparatus may further comprise drive means for causing reciprocating motion of at least one said driveable mass and/or said piston.

The drive means may comprise a shaft adapted to be rotated by means of said motor, a drive member having an engaging portion for engaging at least one said driveable mass and/or said flying mass, and a counterweight offset from a position diametrically opposite said engaging portion.

According to a further aspect of the present invention, there is provided a drive member for a power tool having a housing, a motor in the housing, and a working member adapted to be driven by means of the motor, the drive member comprising an engaging portion and at least one countermass, wherein the drive member is adapted to be mounted to a shaft such that rotation of said shaft in use causes reciprocating motion of said engaging portion, and at least one said countermass is located at a position offset from diametrically opposite said engaging portion.

The drive member may further comprise an annular body portion adapted to be mounted to a shaft, wherein said engaging portion is elongate and extends from said body portion.

BRIEF DESCRIPTION OF THE SEVERAL VIEWS OF THE DRAWINGS

Preferred embodiments of the present invention will now be described, by way of example only and not in any limitative sense, with reference to the accompanying drawings, in which:

FIGS. 13A and 13B illustrate a simulation of performance of the vibration damping apparatus shown in FIG. 12;

FIG. 14 shows data resulting from the simulation of FIGS. 13A and 13B;

DETAILED DESCRIPTION OF THE INVENTION

Figure 1:
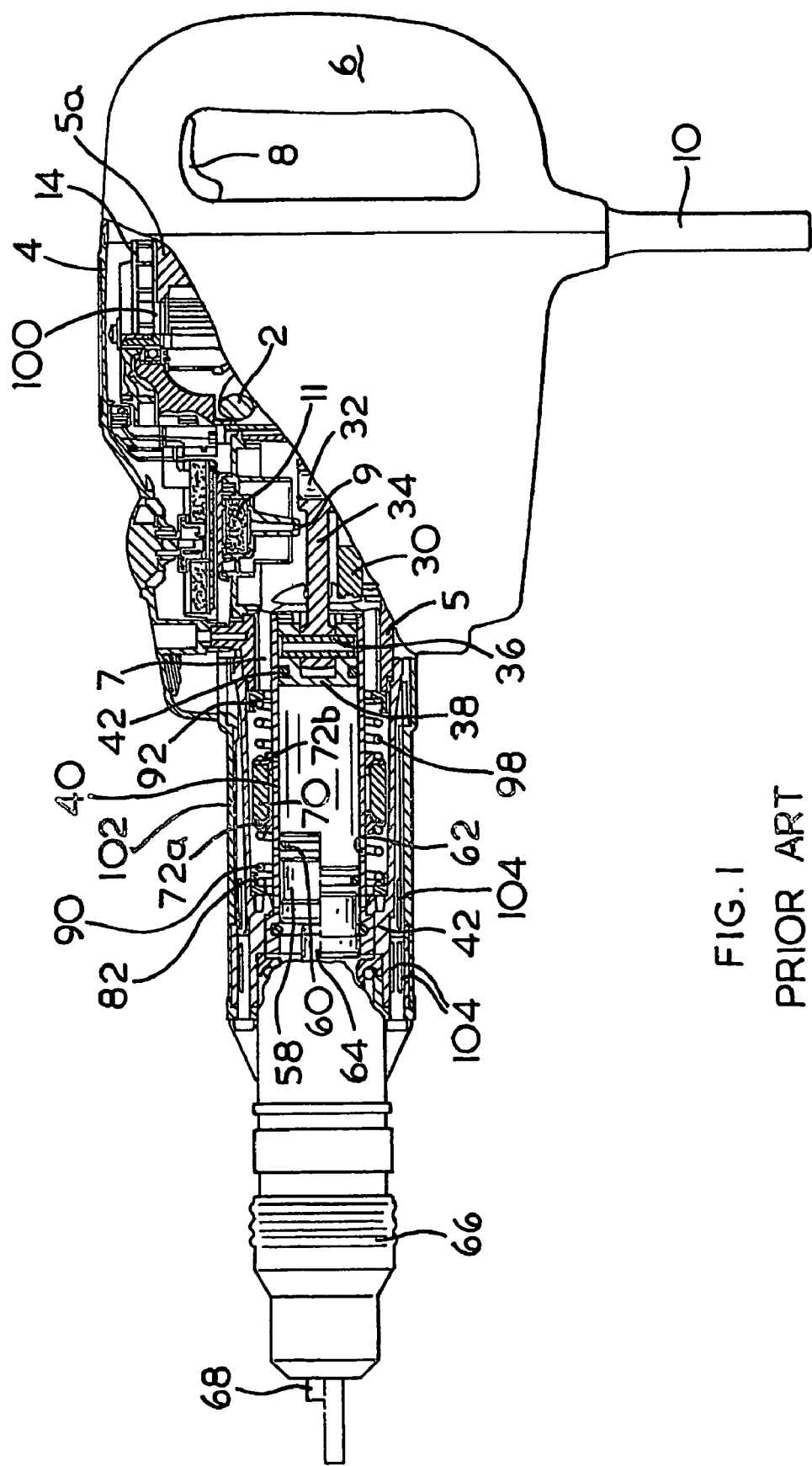
FIG. 1 is a partially cut away side view of a prior art demolition hammer.
Figure 2:
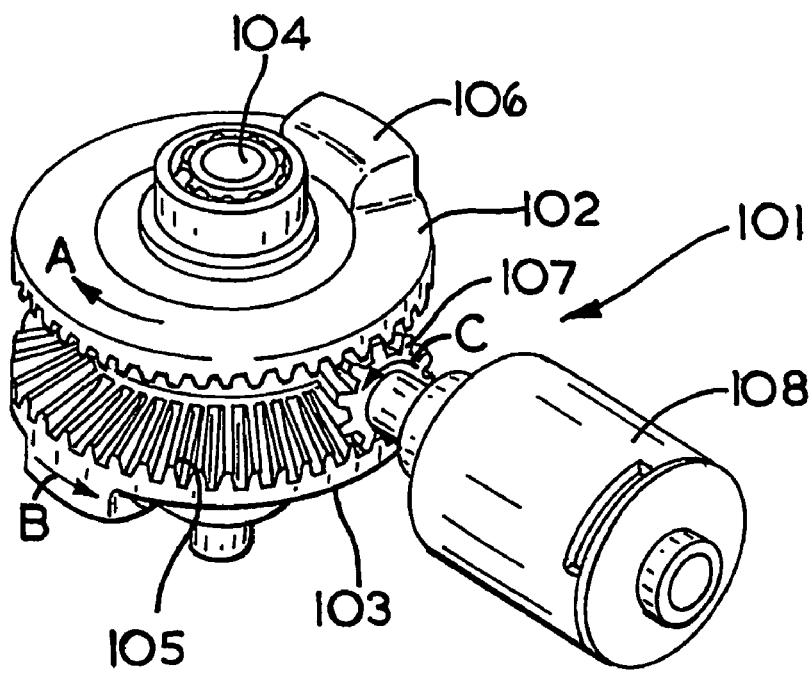
FIG. 2 is a perspective view of a vibration reduction apparatus of a first embodiment of the present invention.

Referring to FIG. 2, a vibration reduction mechanism 101 for use with a hammer, such as the prior art demolition hammer shown in FIG. 1, comprises a pair of substantially identical gear wheels 102,103 mounted to a common shaft 104. Each of the gear wheels 102, 103 consists of a gear face having inclined gear teeth 105, and a weight 106 arranged on the periphery of the wheel 102, 103 such that the overall centre of mass of each wheel 102, 103 is spaced from the axis of rotation passing through common shaft 104. The gear teeth 105 of wheels 102, 103 face each other and mesh with a conical gear 107 such that rotation of wheel 108 in the direction of arrow A in FIG. 2 causes corresponding rotation, via conical gear 107, of wheel 103 in the direction of arrow B. Conical gear 107 is freely rotatable in the direction of arrow C relative to a stepper motor 108, but adjustment of the relative positions of the weights 106 of wheels 102, 103 can be effected by rotation of conical gear 107 in a direction opposite to arrow C by means of stepper motor 108.

The operation of the vibration reduction mechanism shown in FIG. 2 will now be described.

The lower gear wheel 103 is rigidly mounted to shaft 104, whereas the upper wheel can rotate freely on shaft 104. The shaft 104 is connected to a gear mechanism driving a working member, such as a reciprocating flying mass for imparting a hammer action to the bit of the tool, such that the lower wheel 103 rotates at the same frequency as the frequency of reciprocating motion of the flying mass. Because both gear wheels 102, 103 mesh with conical gear 107, the wheels 102, 103 rotate at the same angular velocity but in opposite directions.

The rotational motion of the centre of mass of each gear wheel 102, 103 can be resolved into sinusoidal motion of the centre of mass along perpendicular axes in a plane at right angles to common shaft 104. By varying the angular separation of weights 106 on gear wheels 102, 103 by means of motor 108, the resultant phase and magnitude of the vibrations produced by the vibration reduction apparatus 101 can be adjusted to at least partially counteract vibration of the hammer housing caused by the hammer action imparted to the bit of the tool by the flying mass.

Figure 3:
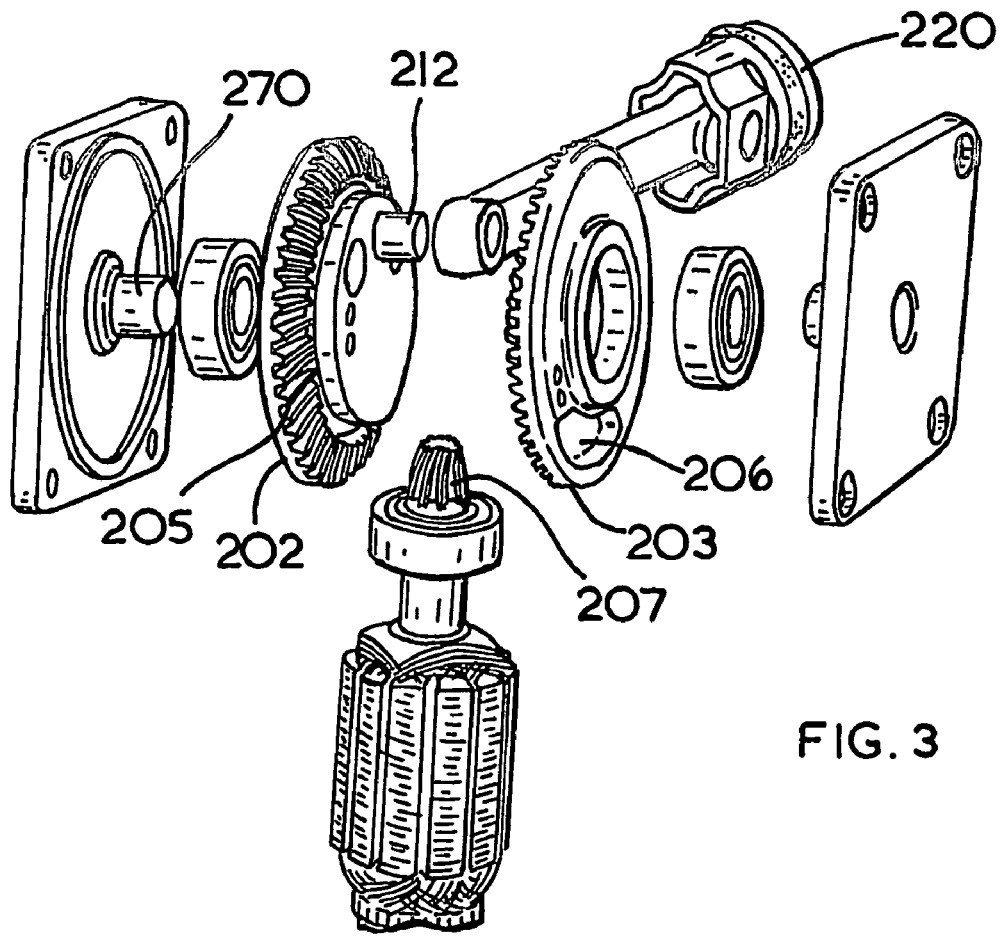
FIG. 3 is an exploded perspective view of a vibration reduction apparatus of a second embodiment of the present invention.

Referring to FIG. 3, in which parts common to the embodiment of FIG. 2 are denoted by like reference numerals but increased by 100, hammer piston 220 is driven by means of eccentric pin 212 on gear plate 202. Gear plate 202 is mounted to a shaft 270 coaxially with gear plate 203, the gear plate 203 being provided with a weight 206. Gear teeth 205 on gear plate 202, 203 mesh with conical gear 207 which is rotated by means of stepper motor 208. In a manner similar to the embodiment of FIG. 2, the angular position of weight 206 relative to eccentric pin 212 is adjusted by rotating conical gear 207 to rotate gear plates 202, 203 relative to each other.

In the embodiment of FIG. 3, vibrations caused by movement of hammer piston 220 are counteracted by the vibrations produced by rotating gear wheel 203, the weight 206 on the periphery of which is generally diametrically opposite pin 212 on the other gear wheel 202.

Figure 4:
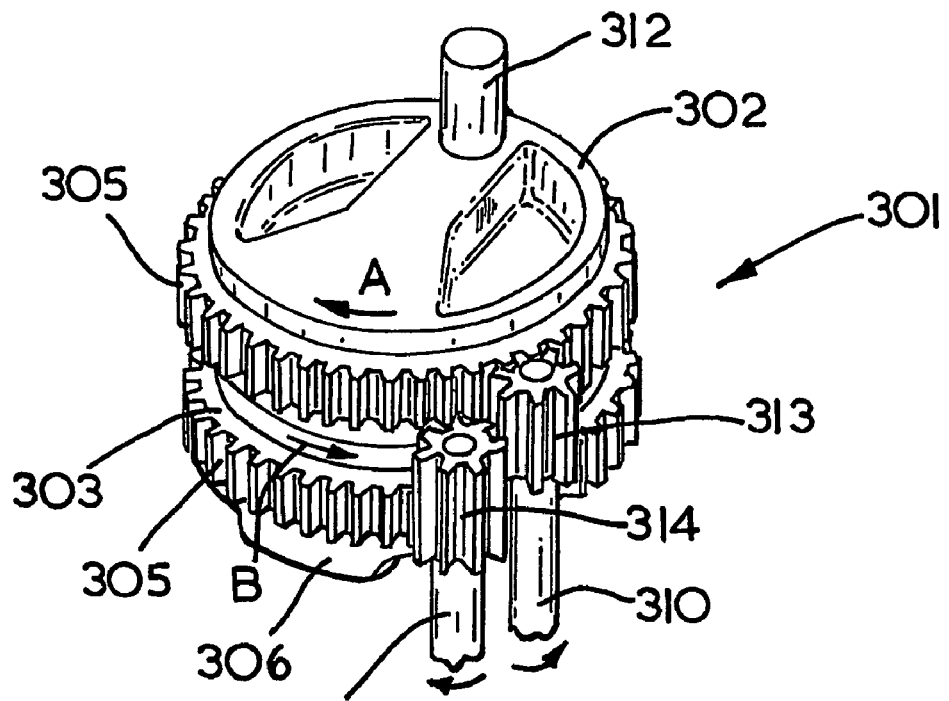
FIG. 4 is a perspective view of a vibration reduction apparatus of a third embodiment of the present invention.

Referring now to FIG. 4, in which parts common to the embodiment of FIG. 3 are denoted by like reference numerals but increased by 100, gear wheels 302, 303 are mounted to a common shaft (not shown) and are each provided with gear teeth 305. Gear wheel 302 carries an eccentric pin 312 which is used to drive a reciprocating output shaft (not shown) for driving a hammer piston similar to that shown in FIG. 3. Gear wheel 303 is provided with a weight 306 on its periphery such that its centre of mass is spaced from the axis of rotation of gear wheel 303, and the wheels 302, 303 are driven independently of each other by means of drive shafts 310, 311 respectively, having respective gears 313, 314 meshing with gear teeth 305 of wheels 302, 303 respectively.

Hammer action is imparted to the bit of the tool by reciprocating motion of the hammer piston causing a flying mass to strike the end of a cylinder. Drive shaft 310 causes rotation of eccentric pin 312, and the shaft 311 is driven such that the wheel 303 rotates at the same frequency as wheel 302, but in the opposite direction, and the phase difference between weight 306 and eccentric pin 312 is chosen such that the vibrations generated by rotation of wheel 303 counteract to the greatest possible extent the vibrations generated by the hammer action of the tool.

Figure 5:
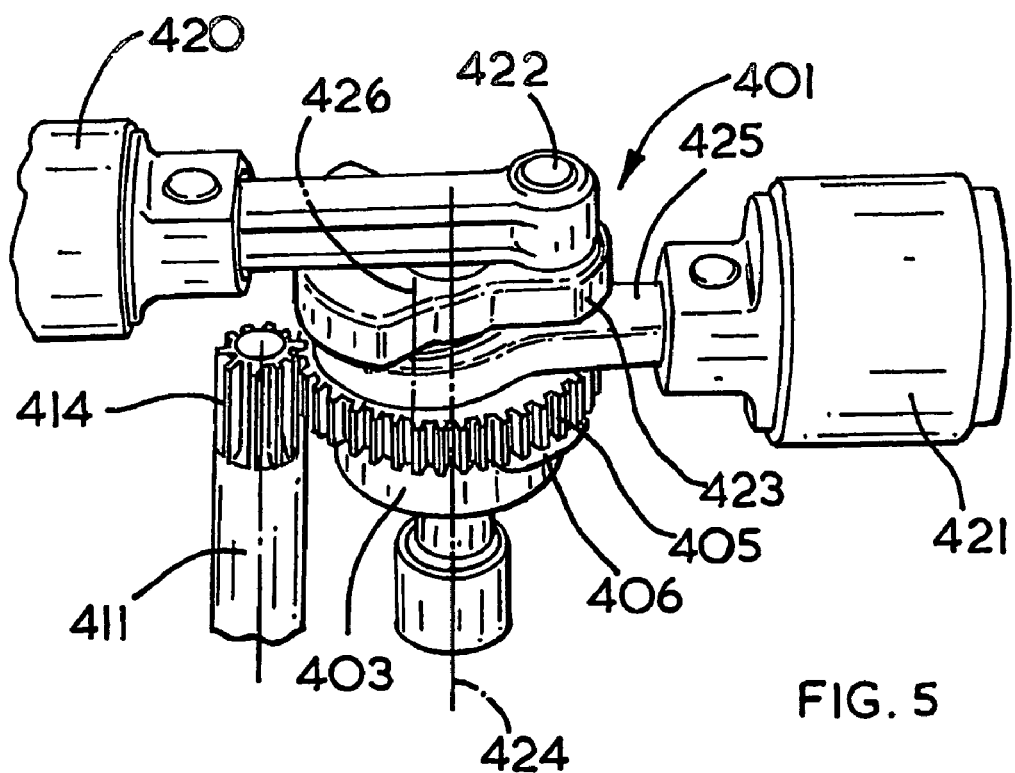
FIG. 5 is a perspective view of a vibration reduction apparatus of a fourth embodiment of the present invention.

FIG. 5, in which parts common to the embodiment of FIG. 4 are denoted by like reference numerals but increased by 100, discloses a vibration reduction apparatus 401 for reducing vibrations caused by reciprocation of a hammer piston 420 which in turn drives a flying mass (not shown) for generating a hammer action. A counter weight 421 is provided for reciprocating motion generally in antiphase with the hammer piston 420. The hammer piston 420 is connected via pivot pin 422 to crank arm 423 and the crank arm 423 is rotated about axis 424 by means of a drive shaft (not shown) connected to the hammer motor. A drive arm 425 is connected to the crank arm 423 at pivot axis 426 such that rotation of crank arm 423 about axis 424 causes reciprocating motion of counterweight 421 at the same frequency as hammer piston 420 but with approximately opposite phase.

A gear wheel 403 has an eccentric weight 406 and is provided with external gear teeth 405 which mesh with gear 414 on drive shaft 411. The drive shaft 411 can be used to rotate gear wheel 403 relative to crank arm 423 such that the angular position of the weight 406 relative to the counterweight 421 can be adjusted. As a result, the phase and amplitude of the resulting vibrations can be adjusted, to take account of the fact that oscillation of the centre of mass of the hammer piston 420 is variable, depending upon the flying masses, the hardness of the surface being hammered and other factors.

Figure 6:
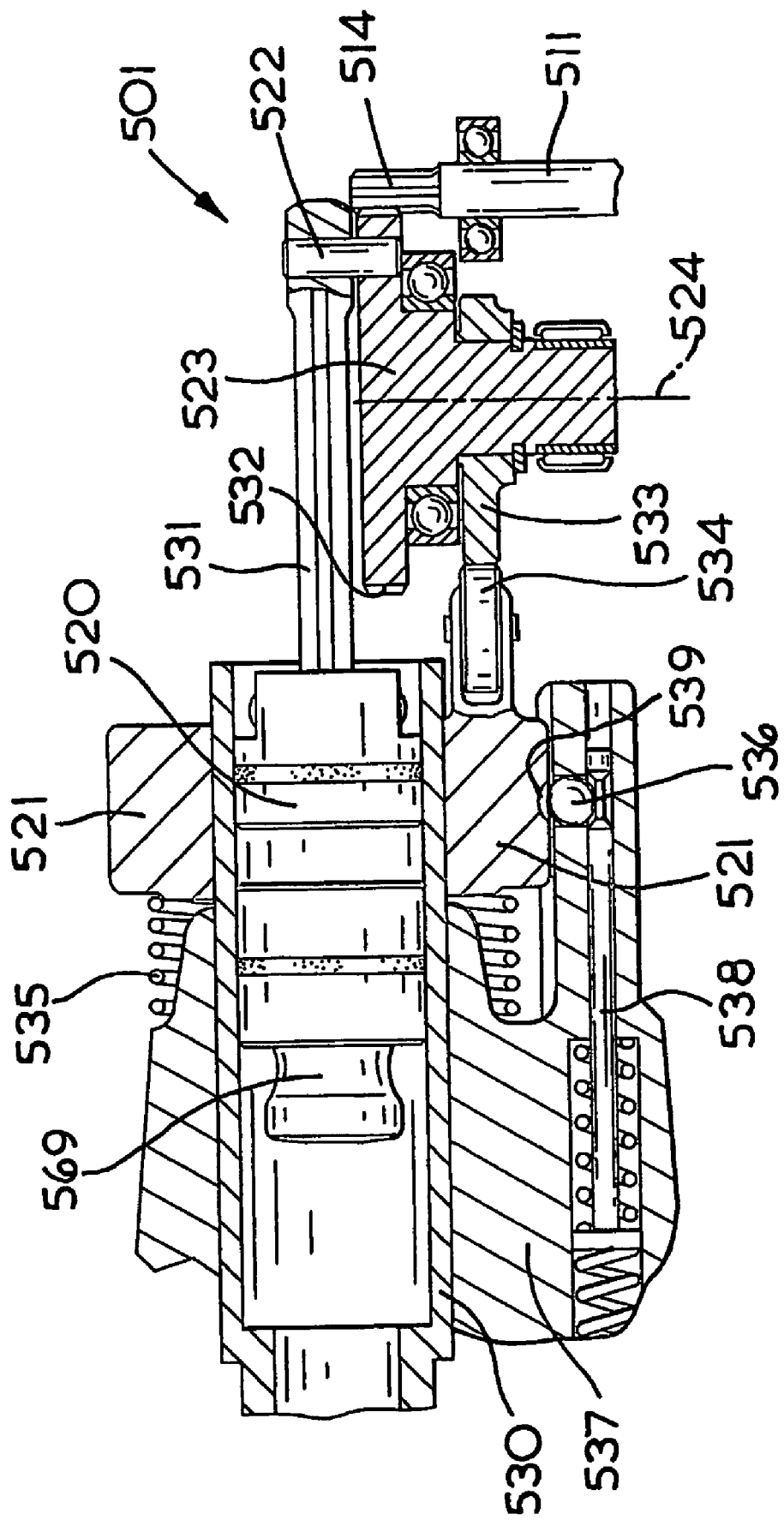
FIG. 6 is a cross sectional side view of a vibration reduction apparatus of a fifth embodiment of the present invention.

Referring now to FIG. 6, in which parts common to the embodiment of FIG. 5 are denoted by like reference numerals but increased by 100, a more compact vibration reduction apparatus 501 for use with a tool having a hammer piston 520 is shown. The hammer piston 520 is caused to reciprocate in cylinder 530 by rotation of a gear wheel 523 about axis 524, the hammer piston 520 being mounted to the gear wheel 523 via piston arm 531 and pivot pin 522. Reciprocating motion of the hammer piston causes a flying mass 569 to be driven along cylinder 530 to impart a hammer action to a bit (not shown) of the tool.

The gear wheel 523 is caused to rotate about axis 524 by meshing of gear 514 on drive shaft 511 with gear teeth 532 on the periphery of gear wheel 523, the drive shaft 511 being caused to rotate by a motor (not shown) of the tool.

The vibration reduction mechanism 501 has a cam 533 rigidly mounted around gear wheel 523, a counterweight 521 surrounding piston cylinder 530, and a cam follower 534 on counterweight 521. The cam follower 534 on counterweight 521 is urged into contact with cam 533 by means of a compression spring 535. The external profile of the cam 533 is such that rotation of gear wheel 534 to cause reciprocating motion of hammer piston 520 causes oscillation of counterweight 521 relative to piston cylinder 530 in antiphase to motion of the hammer piston 520. Since the hammer piston 520 and the counterweight 521 are driven by the same drive shaft 511, this ensures that the counterweight 521 is driven at the same frequency as the hammer piston 520. Because the counterweight 521 surrounds the cylinder 530, the mechanism 501 can be made more compact, and twisting torque produced by operation of the mechanism is minimised.

In order to deactivate the vibration reduction mechanism 501 when the gear wheel 523 is still rotating while the hammer action of the tool is deactivated (for example when the bit of the tool is removed from the work piece ), the counterweight 521 is locked in position relative to the cylinder 530 in its furthest position to the left as shown in FIG. 6. This is achieved by a ball bearing 536 in a housing 537 surrounding the piston cylinder 530 becoming aligned with recess 539 in the external surface of the counterweight 521, the ball bearing 536 normally allowing sliding movement of the counterweight 521 relative to the piston cylinder 530. In order to lock the counterweight 521 in position relative to the piston cylinder 530 when the ball bearing 536 and recess 539 are aligned, a pin 538 is displaced to the right as shown in FIG. 6, as a result of which the ball bearing 536 is displaced upwards into engagement with recess 539 in the counterweight 521 to prevent axial movement of the counterweight 521.In this position, the cam 533 rotates freely on gear wheel 523, but the cam follower 534 is prevented from moving into engagement with the cam 533.

Figure 7:
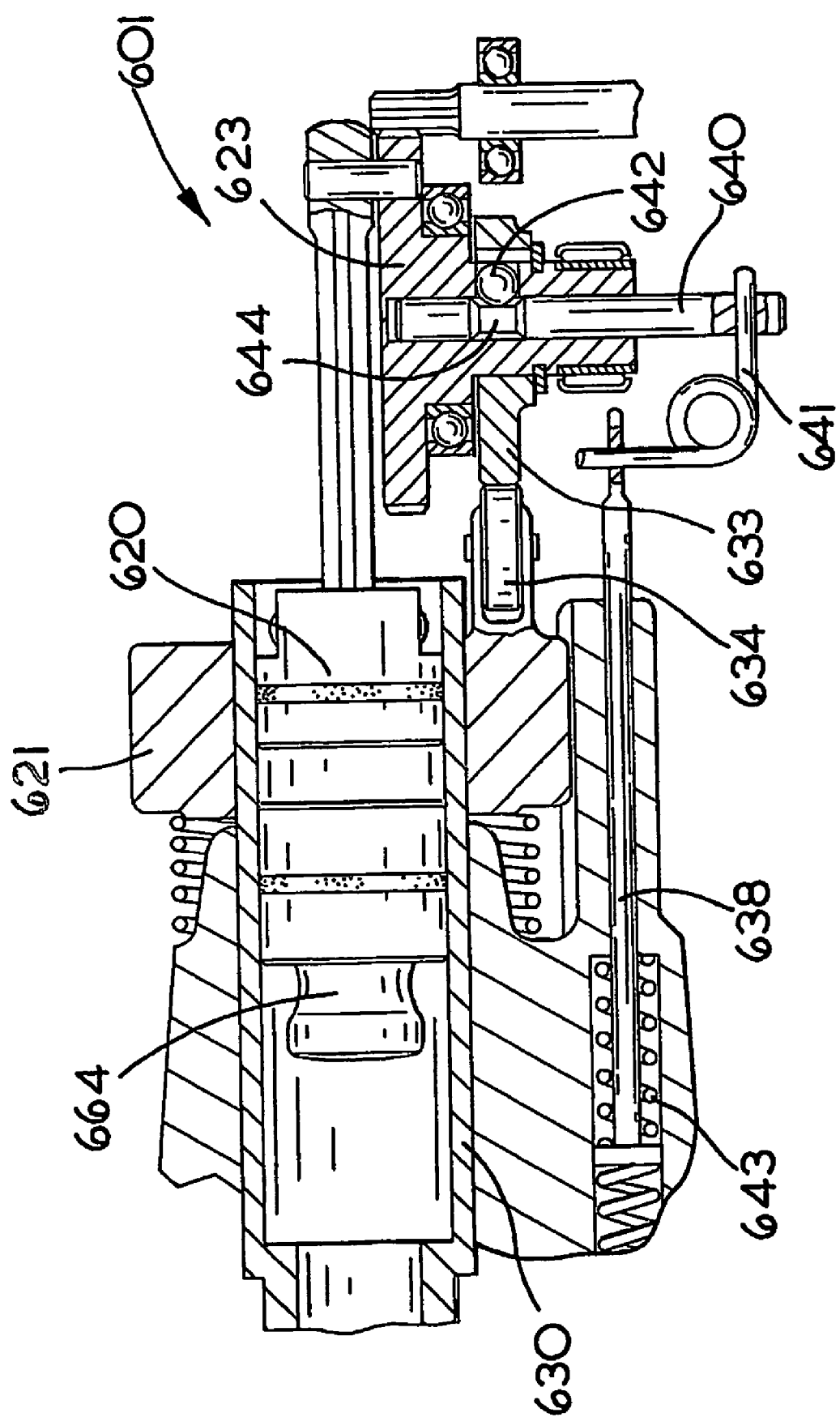
FIG. 7 is a cross sectional view, corresponding to FIG. 6, of a vibration reduction apparatus of a sixth embodiment of the present invention.

Referring to FIG. 7, in which parts common to the embodiment of FIG. 6 are denoted by like reference numerals but increased by 100, a vibration reduction mechanism 601 of a sixth embodiment of the present invention has a cam 633 which is normally rigidly locked to gear wheel 623 by means of a pin 640 which is urged downwards as shown in FIG. 7 by means of torsional spring 641 which in turn urges a ball bearing 642 outwards of the pin 640 to lock the cam plate 633 to the gear wheel 623.

In order to deactivate the vibration reduction mechanism 601, pin 638 is urged to the left as shown in FIG. 7 against the action of compression spring 643 to move pin 640 upwards so that ball bearing 642 can be accommodated in narrowed portion 644 of pin 640. As a result, cam 633 can rotate freely on gear wheel 623, as a result of which the cam 633 does not displace cam follower 634. The counterweight 621 therefore does not move relative to piston cylinder 630.

Figure 8:
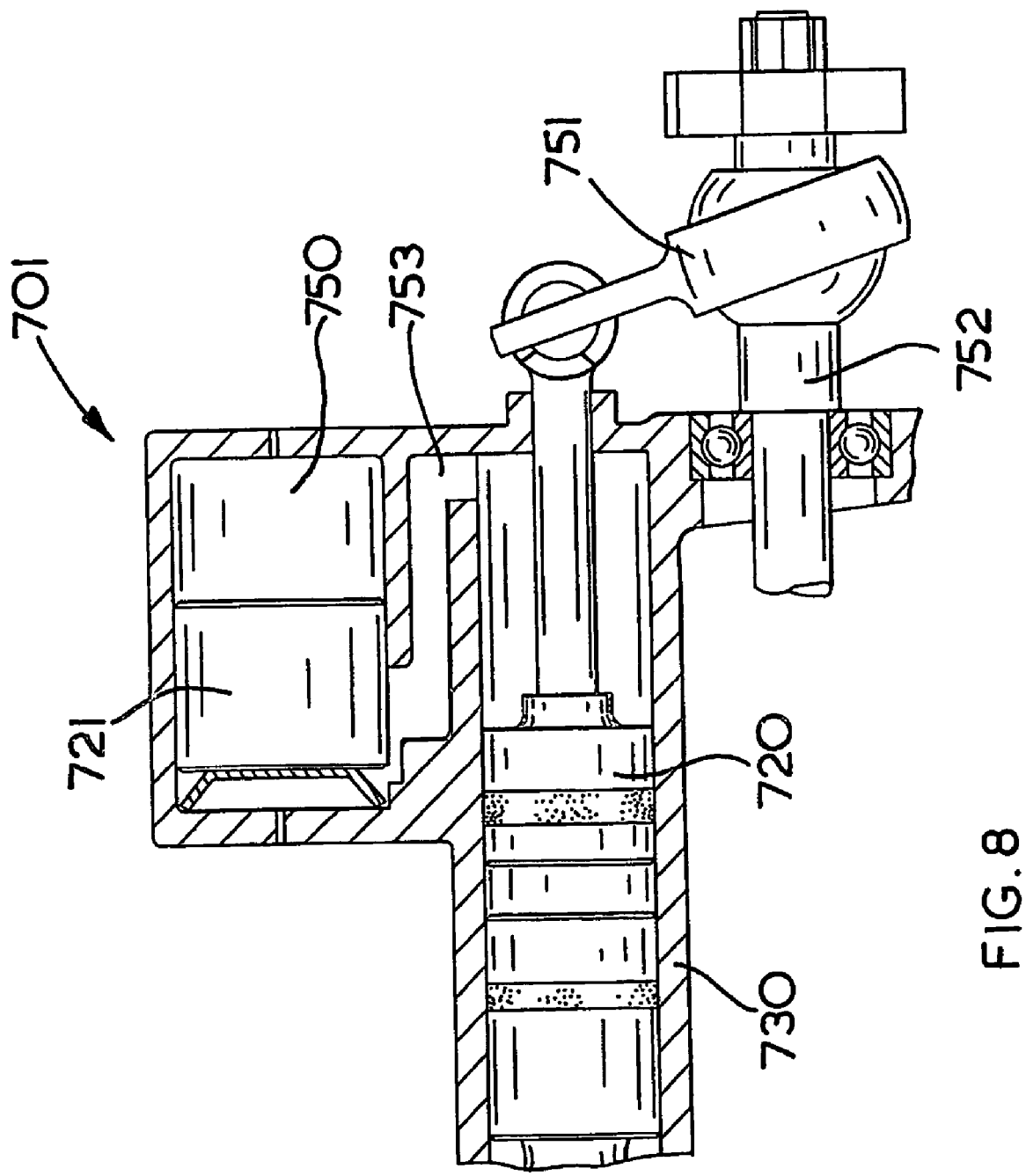
FIG. 8 is a side cross sectional view, corresponding to FIG. 6, of a vibration reduction apparatus of a seventh embodiment of the present invention.

A seventh embodiment of the invention is shown in FIG. 8, in which parts common to the embodiment of FIG. 7 are denoted by like reference numerals but increased by 100. The vibration reduction mechanism 701 has a counterweight 721 provided in a chamber 750 adjacent to piston cylinder 730. Hammer piston 720 is driven reciprocally by means of wobble plate 751 mounted to drive shaft 752 (the drive shaft 752 being connected to the motor), and displacement of hammer piston 720 within piston cylinder 730 causes displacement of air in piston cylinder 730 and channel 753 connecting piston cylinder 730 and chamber 750 such that counterweight 721 is caused to move generally in antiphase with hammer piston 720.

Figure 9:
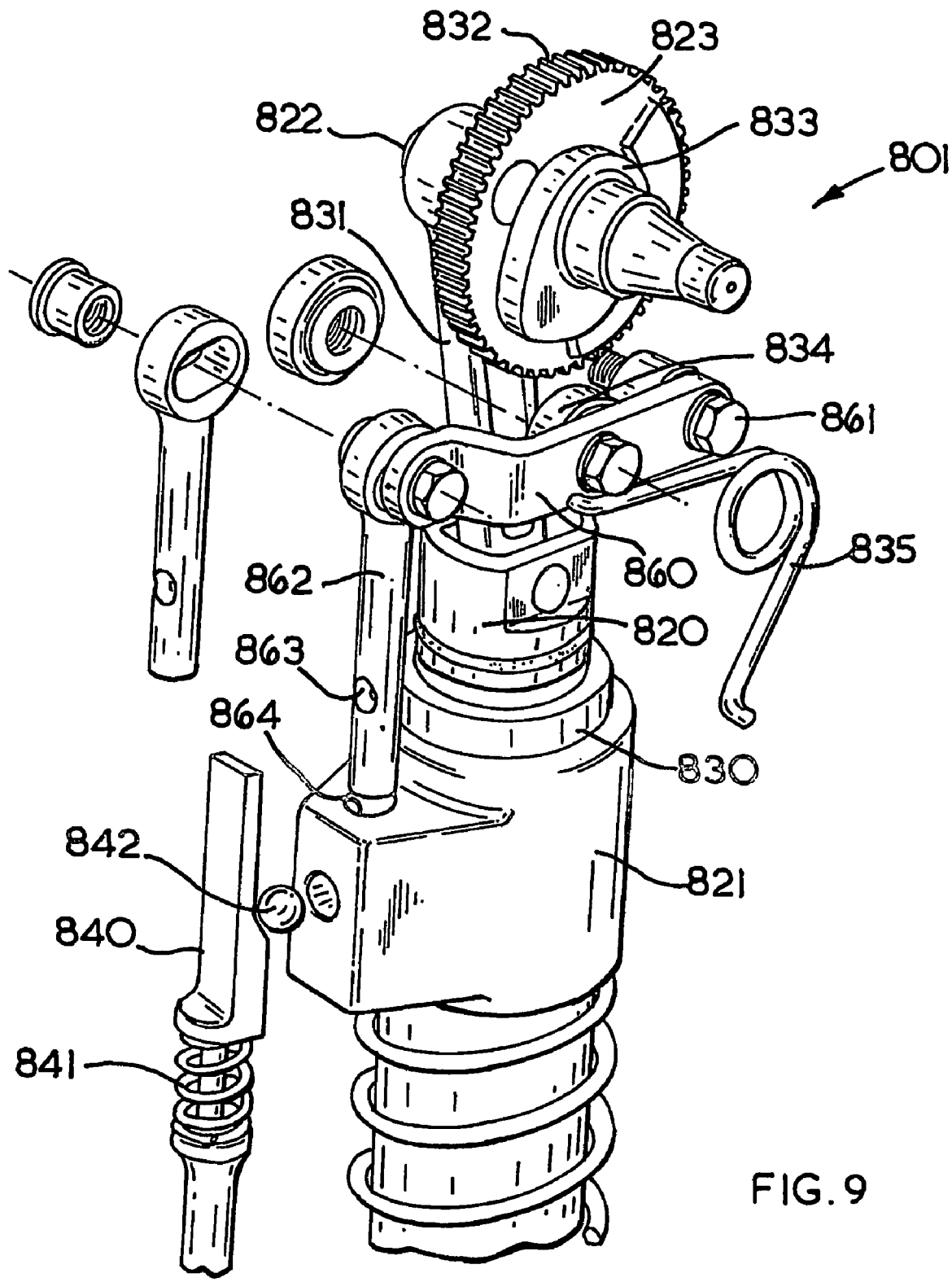
FIG. 9 is an exploded perspective view of a vibration reduction apparatus of an eighth embodiment of the present invention.

Referring to FIG. 9, in which parts common to the embodiment of FIG. 7 are denoted by like reference numerals but increased by 200, a cam 833 is mounted to a gear plate 823, and a cam follower 834 is mounted to pivot arm 860. Pivot arm 860 pivots about pivot pin 861 and is urged by spring 835 into engagement with cam 833. A counterweight 821 is slidably mounted to piston cylinder 830 by means of pin 862, and hammer piston 820 is mounted to gear wheel 823 by means of crank arm 831 and eccentric pin 822. The hammer piston 820 is driven in a reciprocating manner by means of a gear (not shown) on a drive shaft engaging with gear teeth 832 on gear wheel 823, and rotation of gear wheel 823 with cam 833 in engagement with cam follower 834 causes reciprocating motion of counterweight 821 generally in antiphase with hammer piston 820.

Counterweight 821 is mounted to pin 862 by means of a ball bearing 842 which is urged into engagement with a recess 863 on a lower part of pin 862 received in bore 864 of counterweight 821 by means of a pin 840. In order to deactivate the vibration reduction mechanism 801, the pin 840 is urged downwards against the action of compression spring 841 to disengage ball bearings 842 from recess 863 in pin 862. This allows the pin 862 to slide freely in the bore 864 in counterweight 821.

Figure 10:
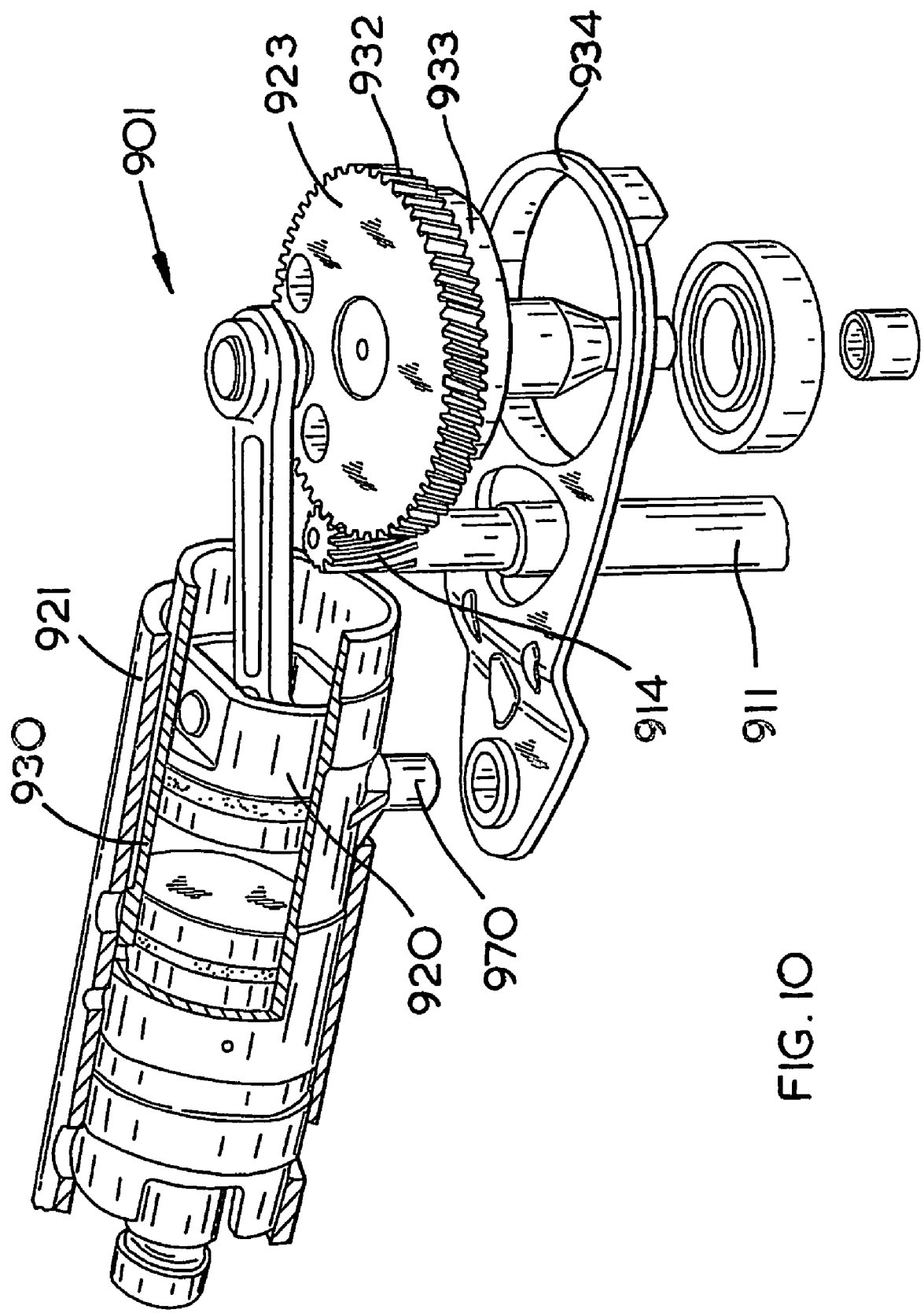
FIG. 10 is a partially cut away perspective view of a vibration reduction apparatus of a ninth embodiment of the present invention.

A compact vibration reduction mechanism 901 of a ninth embodiment of the present invention is shown in FIG. 10, in which parts common to the embodiment of FIG. 9 are denoted by like reference numerals but increased by 100. A hammer piston 920 is driven by means of gear plate 923 having gear teeth 932 engaged by gear 914 on drive shaft 911. A cam 933 is rigidly mounted to gear wheel 923 and is engaged by the internal surface of a cam follower plate 934. Cam follower plate 934 is connected via pin 970 to counterweight 921, which forms part of piston cylinder 930 such that rotation of cam 933 causes oscillation of counterweight 921 in an axial direction.

In order to deactivate vibration reduction apparatus 901, cam follower plate 934 is displaced downwards as shown in FIG. 10 to disengage cam surface of cam follower plate 934 from cam 933. In this way, rotation of gear plate 923 does not cause axial movement of counterweight 921.

Figure 11:
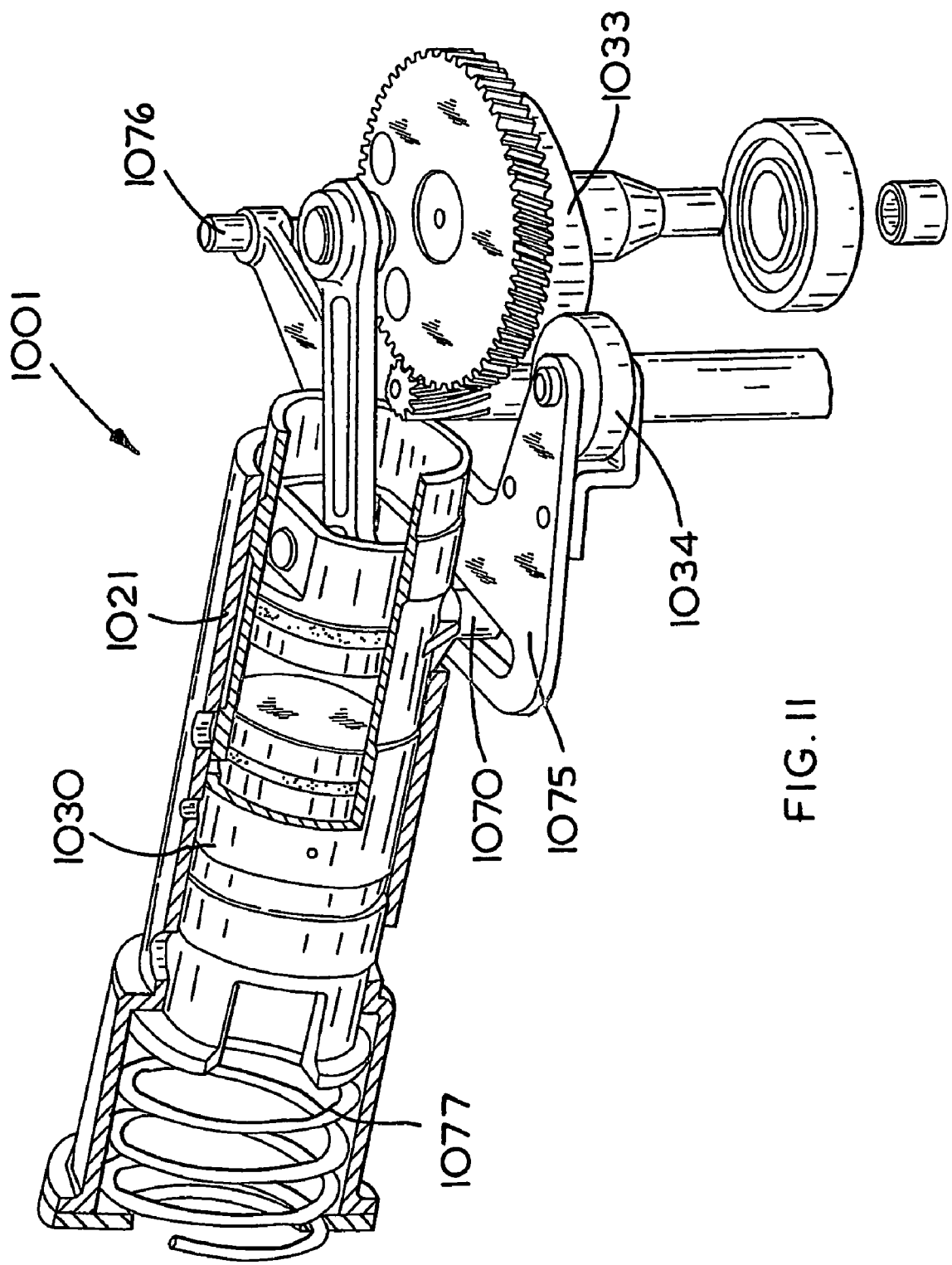
FIG. 11 is a partially cut away view, corresponding to FIG. 10, of a vibration reduction apparatus of a tenth embodiment of the present invention.

Referring to FIG. 11, in which parts common to the embodiment of FIG. 10 are denoted by like reference numerals but increased by 100, a cam follower 1034 is urged by means of a spring (not shown) into engagement with cam 1033 and is supported by yoke plate 1075 which is pivotable about pivot 1076 and is connected via pin 1070 with counterweight 1021 forming part of piston cylinder 1030. The cam follower is biased by means of compression spring 1077 into engagement with cam 1033, and the vibration reduction apparatus 1001 can be deactivated by moving counterweight 1021 to the left as shown in FIG. 11 against the action of compression spring 1077.

Figure 12:
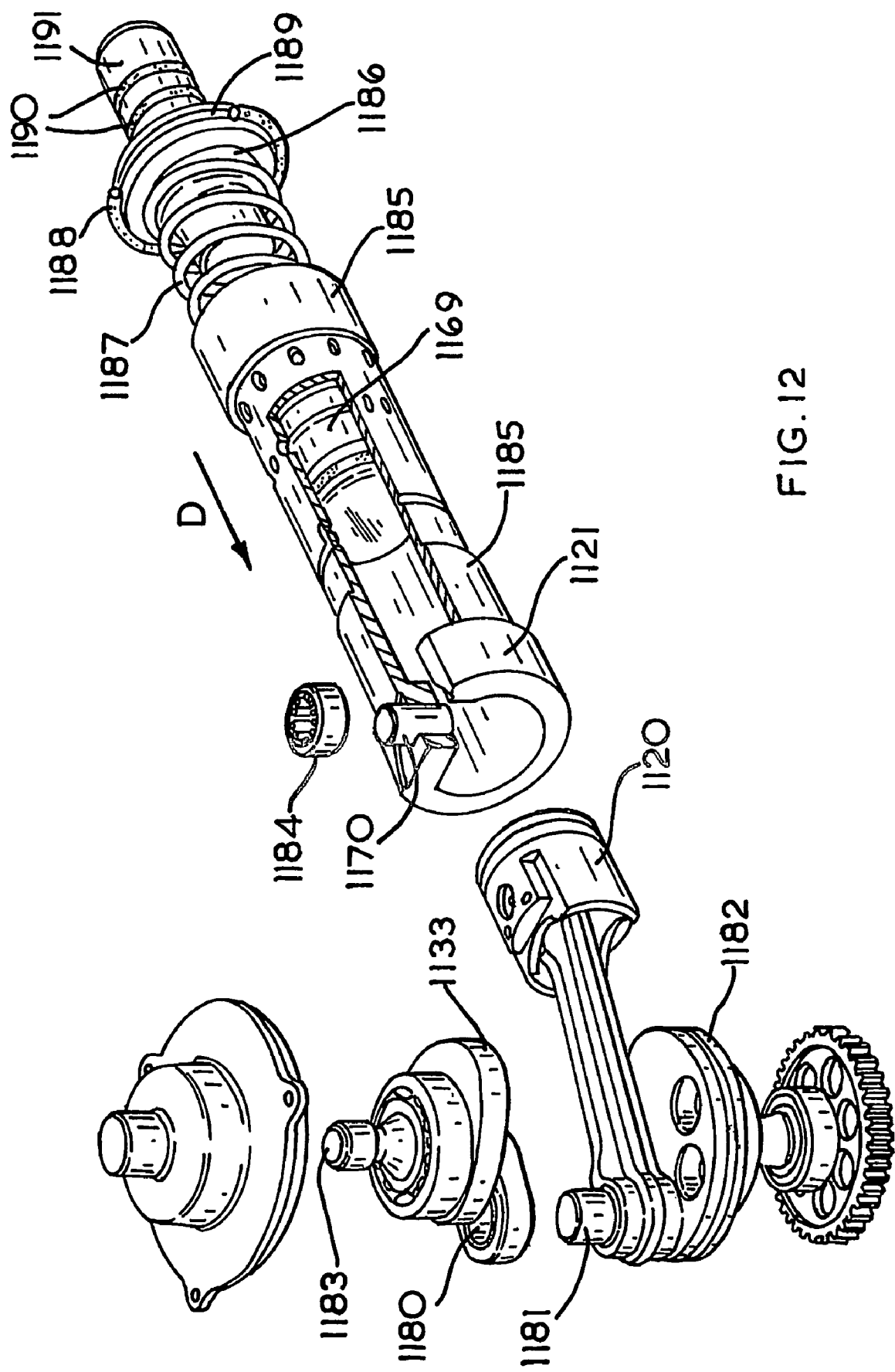
FIG. 12 is a partially cut away view of a vibration reduction apparatus of an eleventh embodiment of the present invention.

An eleventh embodiment of the invention is shown in FIG. 12, in which parts common to the embodiment of FIG. 11 are denoted by like reference numerals but increased by 100. A cam 1133 is mounted via an aperture with a bearing 1180 to a pin 1181 such that rotation of crank 1182 causes rotation of cam 1133 about rotation axis 1183. A bearing 1184 is mounted to a pin 1170 on cylinder housing 1121 such that when the cylinder housing 1121 is urged in the direction of arrow D, the bearing 1184 is in contact with the peripheral surface of cam 1133. Consequently, as the crank 1182 is rotated to drive piston 1120, the cylinder housing 1121, which is mounted for slideable movement relative to the tool housing (not shown), is caused to move in antiphase with the piston 1120. Movement of piston 1120 in cylinder 1121 causes movement of a ram 1169. A beat piece 1186 is mounted to the end of cylinder housing 1121 by means of a spring 1187 and has an O-ring 1188 mounted to groove 1189, and a pair of O-rings 1190 on an end portion 1191 thereof.

The cylinder 1121 is mounted to the housing in such a way that when the tool is disengaged from a workpiece (not shown), the beat piece 1186 is separated from the end of cylinder housing 1121 by compression spring 1187, as a result of which the ram 1169 does not come into contact with the beat piece 1186. In this condition, the bearing 1184 is not urged into engagement with cam 1133, as a result of which the cylinder housing 1121 is not caused to oscillate. When the tool engages the workpiece, the beat piece 1186 is pushed against the forces of spring 1187 into contact with the end of cylinder housing 1121, and bearing 1184 is urged into contact with the surface of cam 1133. As a result, reciprocating motion of piston 1120 causes reciprocating motion of ram 1169, which contacts beat piece 1186 at the end of its stroke, and the cylinder housing 1121 is driven in antiphase with the piston 1120. On disengagement of the tool from the workpiece, the cylinder 1121 is pushed in the direction opposite to arrow D shown in FIG. 12, and the beat piece 1186 is retained in a position out of engagement with the end of cylinder housing 1121 by engagement of O-ring 1188 with the housing. As a result, the vibration damping apparatus is automatically deactivated on disengagement of the tool from the workpiece.

FIGS. 13A and 13B illustrate a simulation of the performance of the vibration damping apparatus shown in FIG. 12, and the result of the simulation are shown in FIG. 14. A comparison of the vibrations generated without activation of the vibration damping apparatus (16.5 m/s$^2$) with the vibrations generated when the vibration damping apparatus is activated (6.5 m/s$^2$) shows that the arrangement shown in FIG. 12 reduces vibrations by approximately 60%.

Figure 15:
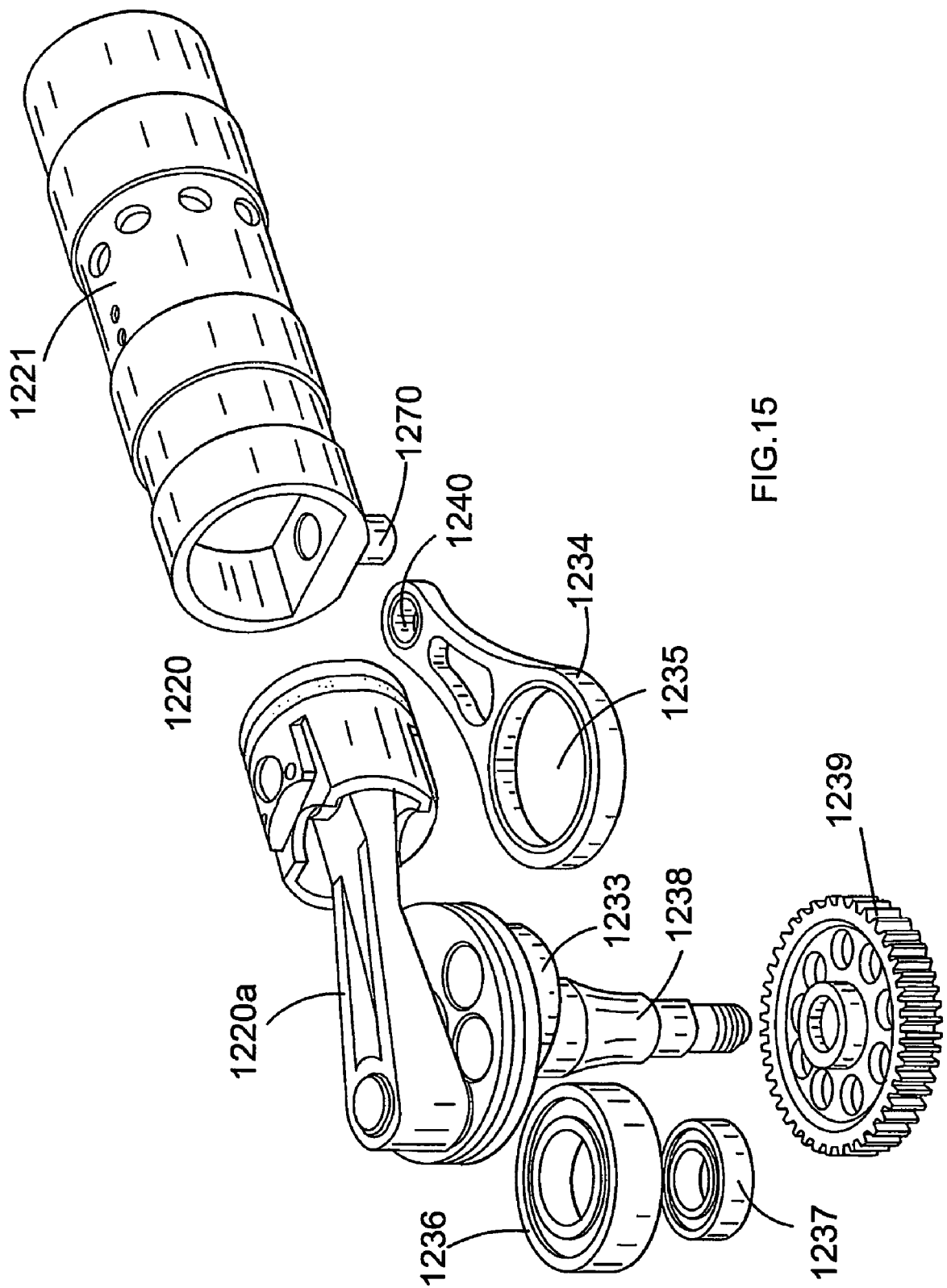
FIG. 15 is a partially exploded perspective view, corresponding to FIG. 12, of a vibration reduction apparatus of a twelfth embodiment of the present invention.

A twelfth embodiment of the invention is shown in FIG. 15, in which parts common to the embodiment of FIG. 12 are denoted by like reference numerals but increased by 100.

A cam follower 1234 having a generally circular aperture 1235 at one end thereof is mounted to and surrounds a cam surface 1233 and is held in position around the cam surface by means of bearings 1236, 1237 around a shaft 1238 driven by gear 1239. The gear 1239 also drives piston 1220 via arm 1220a. An aperture 1240 at the end of cam follower 1234 opposite to circular aperture 1235 is mounted to a pin 1270 on the lower surface of cylinder 1221, such that rotation of shaft 1238 to drive piston 1220 via arm 1220a also causes rotation of cam surface 1233, which in turn causes reciprocating motion of aperture 1240 and pin 1270. This in turn results in linear reciprocating motion of cylinder 1221 in anti phase with the reciprocating motion of piston 1220.

In the arrangement of FIG. 15, the cam follower 1234 is not disengaged from the cam surface 1233 or pin 1270 when the tool bit (not shown) is disengaged from a workpiece (not shown), as a result of which the vibration reduction mechanism is always switched on, and vibrations caused by the vibration reduction mechanism are tolerated. However, the embodiment of FIG. 15 has the advantage of making maximum use of existing parts and simplifying the construction of the apparatus, as well as making the apparatus of compact construction.

Figure 16:
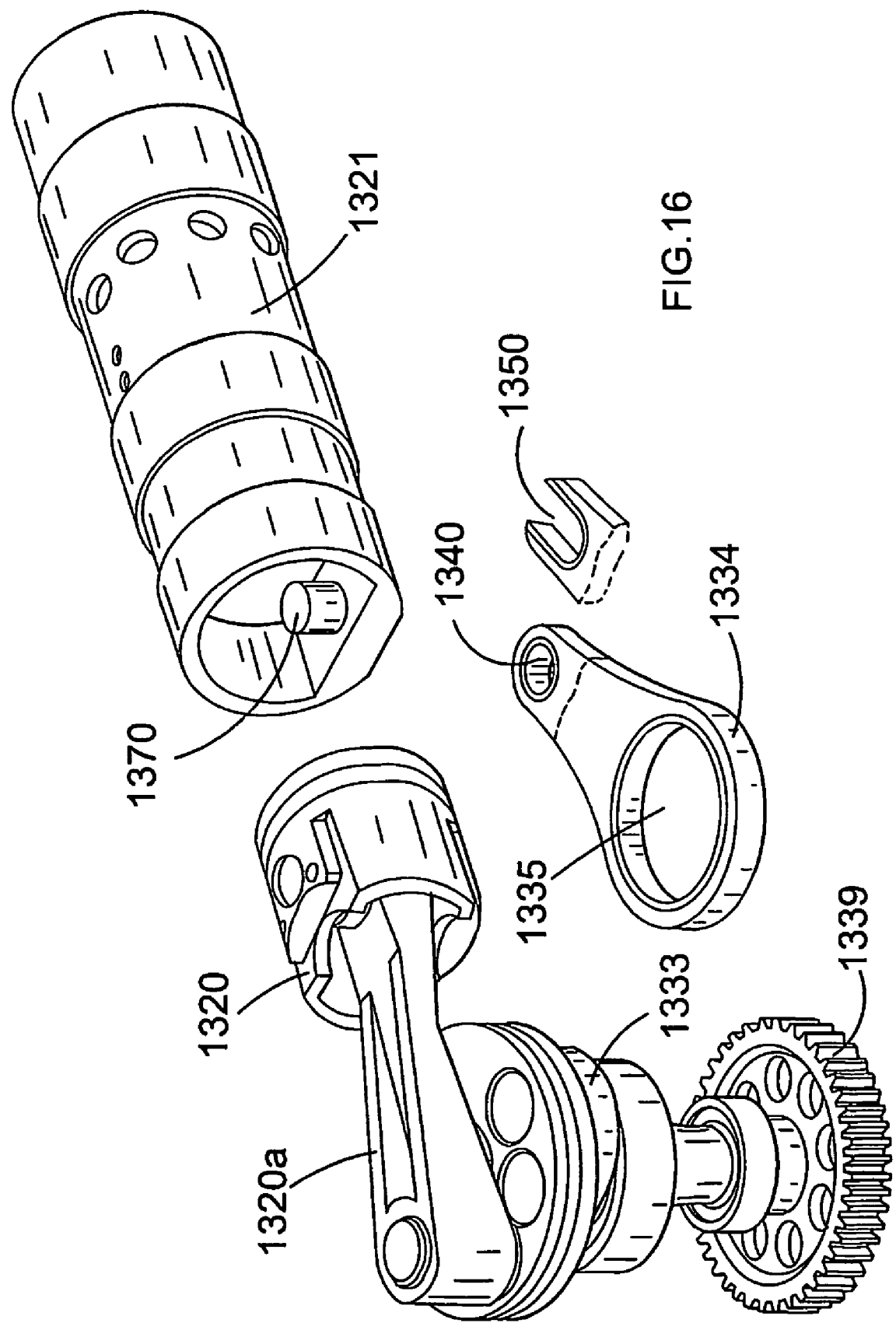
FIG. 16 is a partially exploded perspective view, corresponding to FIG. 12, of a vibration reduction apparatus of a thirteenth embodiment of the present invention.
Figure 17:
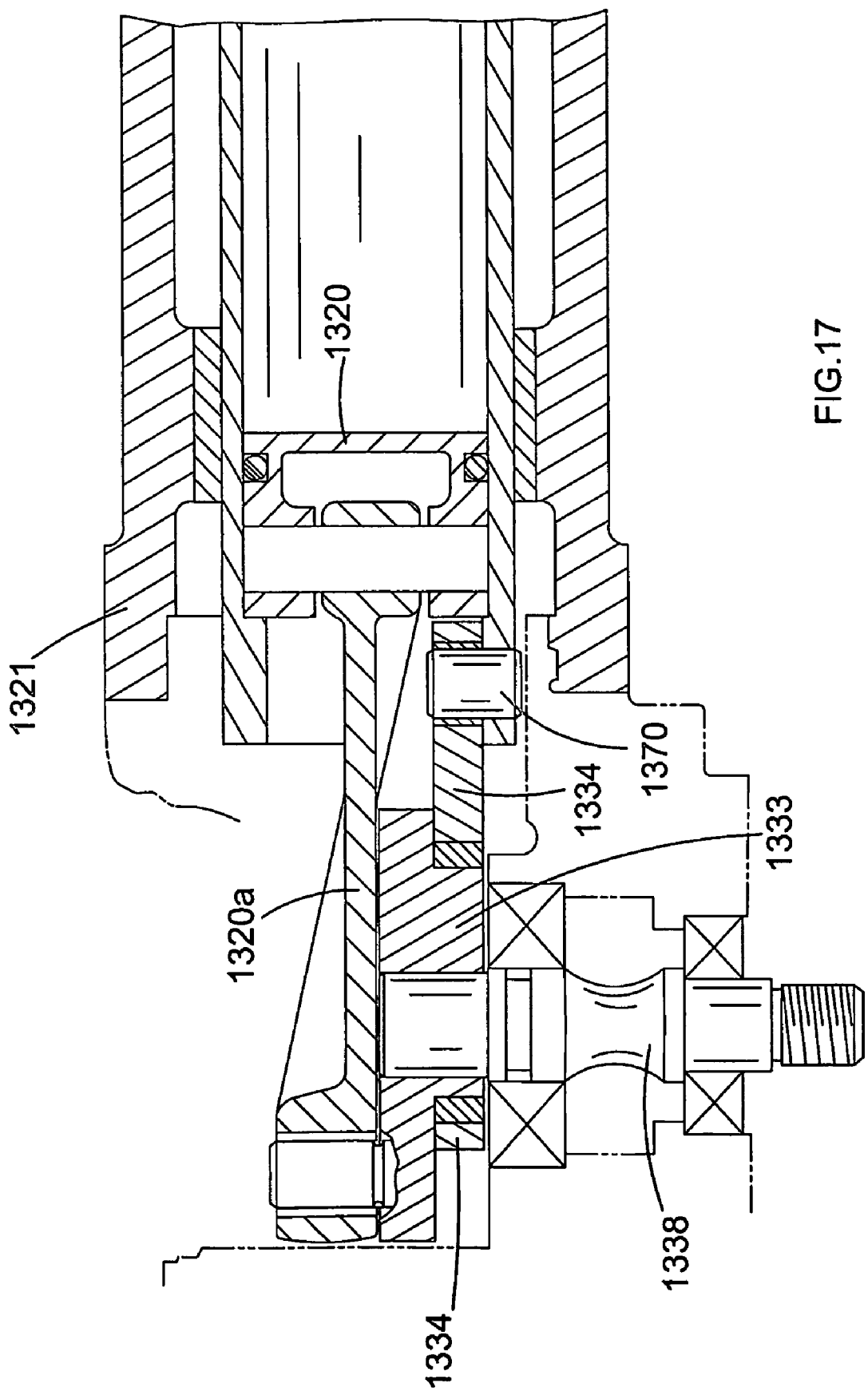
FIG. 17 is a cross sectional elevation view of the apparatus of FIG. 16.

Referring now to FIGS. 16 and 17, in which parts common to the embodiment of FIG. 15 are denoted by like reference numerals but increased by 100, a thirteenth embodiment of the invention differs from the embodiment of FIG. 15 in that cam follower 1334 having generally circular aperture 1335 is mounted to a pin 1370 provided on an internal surface of the piston cylinder 1321. As can be best seen in FIG. 17, the pin 1370 is arranged inside piston cylinder 1321, as a result of which the pin 1370 sits behind piston 1320 in the reanmost position of the piston 1320. This enables the apparatus to be of considerably more compact construction than other embodiments.

An alternative arrangement of the cam follower 1334 is also shown in FIG. 16, in which the aperture 1340 at the forward end of the cam follower 1334 is replaced by a generally U-shaped notch 1350 for engaging the pin 1370 provided in the piston cylinder 1321. The notch 1350 enables the pin 1370 to be disengaged from the cam follower 1334 by means of biasing means (not shown) when the tool is disengaged from a workpiece (not shown) in a manner similar to the embodiment of FIG. 12, to deactivate the vibration reducing apparatus. When the tool bit is pushed into engagement with a workpiece, the cam follower 1334 is pushed into engagement with the pin 1370, so that the pin 1370 is received in the notch 1350 throughout the entire path of the aperture 1340.

Figure 18:
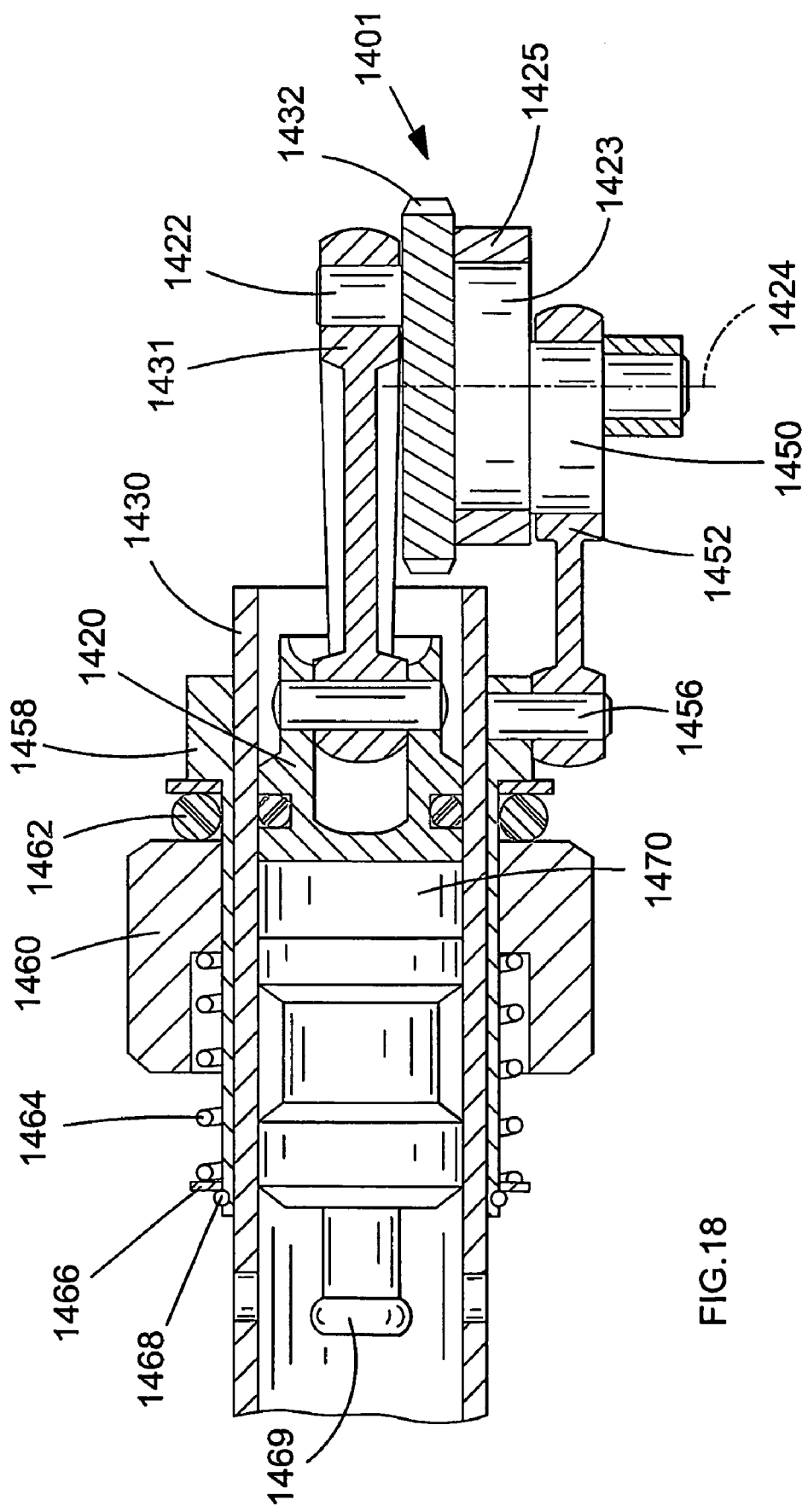
FIG. 18 is a side cross-sectional view of a vibration reduction apparatus of a fourteenth embodiment of the present invention.

Referring to FIG. 18, in which parts in common to the embodiment of FIG. 6 are denoted by like reference numerals but increased by 900, a vibration reduction apparatus 1401 for use in a power hammer having a hammer piston 1420 reciprocally sliding inside a piston cylinder 1430 is shown. The hammer piston 1420 is pivotaily mounted to gear wheel 1423, mounted in bearing 1425 and having teeth 1432, via rod 1431 and pin 1422. A further arm 1452 is mounted via pivot 1450 to gear wheel 1423 such that rotation of gear wheel 1423 about axis 1424 causes arms 1431 and 1452 to oscillate in anti-phase with each other. Arm 1452 is pivotally mounted via pin 1456 to a sleeve 1458 slidably mounted on an external surface of piston cylinder 1430.

A countermass 1460 surrounds and is slidably mounted to an external surface of the sleeve 1458 via a resilient O-ring 1462 and a compression spring 1464. The spring 1464 abuts flange 1466, which in turn is restrained by circlip 1468, to urge countermass 1460 towards resilient O-ring 1462.

The operation of the vibration damping means 1401 shown in FIG. 18 will now be described.

When the gear wheel 1423 is rotated about shaft 1424 by means of engagement of a drive shaft (not shown) with teeth 1432 on gear wheel 1423, the arms 1431 and 1452 move in opposite directions to each other. In the case in which the hammer piston 1420 moves to the left as shown in FIG. 18, an air spring, formed in space 1470 between hammer piston 1420 and a flying mass in the form of a beat piece 1469 is initially compressed, until the compressed air spring causes the beat piece 1469 to move to the left, in a manner which ill be familiar to persons skilled in the art. In this way, there is a slight delay between movement of the hammer piston 1420 to the left in FIG. 18 and subsequent movement of the beat piece 1469 to the left At the same time, arm 1452 moves sleeve 1458 to the right as shown in FIG. 18. As the sleeve 1458 moves to the right, it begins to move to the right relative to countermass 1460, as a result of which compression spring 1464 is initially compressed, and countermass 1460 then begins to move to the right with sleeve 1458. In other words, initially sleeve 1458 moves to the right and then after a short delay the sleeve 1458 and countermass 1460 move to the right, to balance initial movement of hammer piston 1420 only to the left, followed after a short delay by movement of hammer piston 1420 and beat piece 1469 to the left. It will therefore be appreciated that by suitable choice of the characteristics and tension of compression spring 1464, the delay between movement of the sleeve 1458 and countermass 1460 can be made generally equal to that between movement of the hammer piston 1420 and beat piece 1469, such that the mechanical compression spring 1464 imitates the behaviour of air spring in space 1470. By more closely matching the behaviour of the hammer piston 1420 and beat piece 1469, vibrations in the apparatus are further reduced.

Figure 19A:
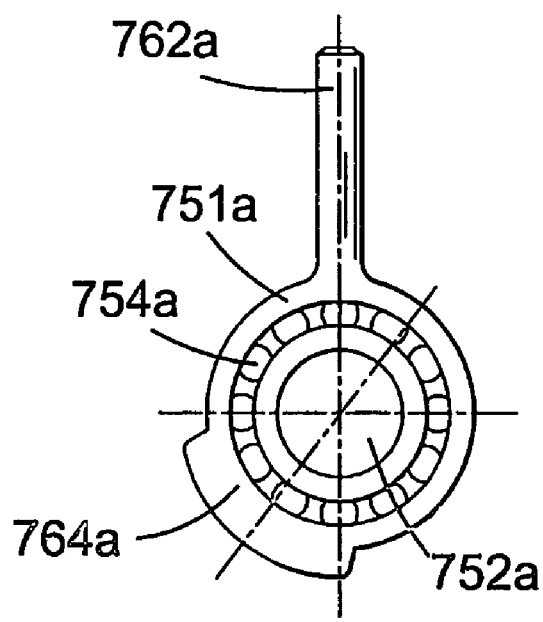
FIG. 19A is a cross-sectional view of a wobble bearing for use with the present invention.
Figure 19B:
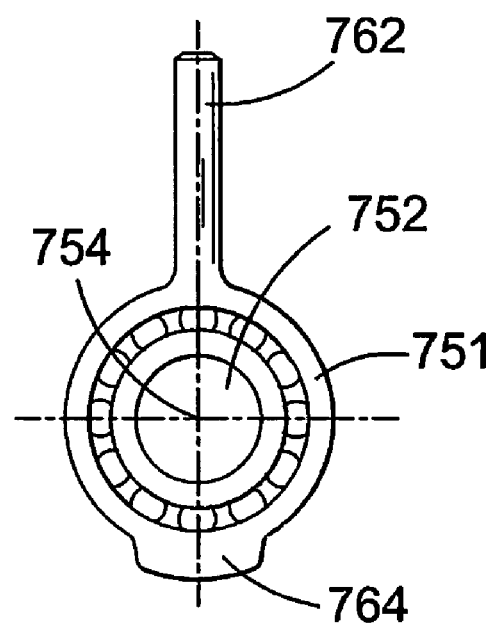
FIG. 19B is a view, corresponding to FIG. 19A, of a prior art wobble bearing.

Referring to FIG. 19B, the wobble bearing arrangement of FIG. 8, which is of a conventional construction which will be well known to persons skilled in the art, is shown in greater detail. Wobble plate 751 is mounted to shaft 752 via bearings 760 to enable the wobble plate 751 to rotate relative to shaft 752 as shaft 752 rotates about its longitudinal axis 754. The wobble plate 751 has a finger 755 for engaging an arm of piston 720 and a countermass 764 arranged diametrically opposite finger 762. As will be appreciated by persons skilled in the art, as shaft 752 rotates about its longitudinal axis 754, finger 762 is caused to move in a reciprocating manner in the direction of the longitudinal axis of the apparatus to cause reciprocating movement of hammer piston 720 in piston cylinder 730.

Referring now to FIG. 19A, an improved wobble bearing arrangement has a wobble plate 751*a* mounted to shaft 752*a* via bearing 754*a*. The wobble plate has a finger 762*a* and a countermass 764*a*. The mass of countermass 764*a* is larger than that of countermass 764 of FIG. 19, and the countermass 764*a* of FIG. 19A is arranged at an angle different from 180 degrees relative to finger 762*a*. As a result, the vibrations generated by the wobble bearing of FIG. 19A can be more closely matched to the characteristics of the hammer apparatus incorporating the wobble bearing in operation, as a result if which, by suitable choice of the mass and angular position of countermass 764*a*, vibrations produced by the wobble bearing can be minimised.

It will be appreciated by persons skilled in the art that the above embodiments have been described by way of example only and not in any limitative sense, and that various alterations and modifications are possible without departure from the scope of the invention as defined by the appended claims.

The invention claimed is:

1. A vibration reduction apparatus for a power hammer apparatus comprising a housing, a motor arranged in the housing, a piston, a reciprocating drive drivable by the motor to drive the piston in reciprocating motion in a bore, and a flying mass arranged in the bore such that said reciprocating motion of said piston in said bore in use causes reciprocating motion of said flying mass relative to the housing to impart impacts to a working member of the hammer apparatus, the vibration reduction apparatus comprising a driveable mass surrounding at least part of the bore, a cam rotatable by the reciprocating drive and engagable to the drivable mass, and a first biasing member for urging the drivable mass into driving engagement with the cam and wherein the driveable mass is caused by the motor to execute reciprocating motion to at least partially cancel vibration of said housing caused by reciprocating motion of the flying mass relative to the housing.

2. A vibration reduction apparatus according to claim 1, further comprising a driving gear drivable by said motor to cause said reciprocating motion of said piston and to cause said reciprocating motion of at least one said driveable mass.

3. A vibration reduction apparatus according to claim 1, further comprising a cam follower for convening rotary motion of said cam into reciprocating motion of said drivable mass.

4. A vibration reduction apparatus according to claim 3, wherein said first biasing member urges the drivable mass into engagement with said cam follower.

5. A vibration reduction apparatus according to claim 3, wherein said cam follower comprises a notch shaped to receive a respective projection on said drivable mass.

6. A vibration reduction apparatus according to claim 1, wherein the driveable mass is moves out of engagement with the cam when the power hammer apparatus is disengaged from a workpiece.

7. A vibration reduction apparatus according to claim 6, further comprising a retainer for holding the driveable mass out of engagement with said cam when the power hammer apparatus is disengaged from a workpiece.

8. A vibration reduction apparatus according to claim 7, wherein said retainer comprises a seal acting between a working member of said power hammer apparatus and said housing.

9. A vibration reduction apparatus according to claim 1, further comprising means for deactivating said vibration reduction apparatus responsive to disengagement from the workpiece.

10. A vibration reduction apparatus according to claim 9, wherein said means for deactivating comprises means for disengaging said cam from said motor.

11. A vibration reduction apparatus according to claim 9, wherein said means for deactivating comprises means for locking said driveable mass in position relative to the housing.

12. A vibration reduction apparatus according to claim 1, further comprising means for adjusting the one of the phase of vibrations and the amplitude of vibrations produced by said vibration reduction apparatus.

13. A power hammer apparatus comprising:
a housing;
a motor arranged in the housing;
a piston drivable said motor to execute reciprocating motion in a bore;

a flying mass arranged in the bore such that said reciprocating motion of said piston in said bore in use causes reciprocating motion of said flying mass relative to said housing to impart impacts to a working member of the power hammer apparatus; and a vibration reduction apparatus including:
- a drivable mass at least partially surrounding the bore;
- a cam drivable said motor;
- a first biasing member for urging the counter weight into driving engagement with the cam; and
- wherein the drivable mass is drivable by the cam, against the first biasing member, to execute reciprocating motion to at least partially cancel vibration caused by reciprocating motion of the flying mass relative to the housing.

14. A power hammer apparatus according to claim 13, further comprising a piston cylinder defining said bore.

15. A power hammer apparatus according to claim 14, where said driveable mass forms at least part of said piston cylinder.

16. A power hammer apparatus according to claim 15, further comprising a projection on said piston cylinder for engaging a cam follower of said vibration reduction apparatus.

17. A power hammer apparatus according to claim 16, wherein said projection is provided on an internal surface of said piston cylinder.

18. A power hammer apparatus according to claim 13, further comprising drive transmission for causing reciprocating motion of at least one of the set comprising said driveable mass and said piston.

* * * * *